US007976260B2

(12) United States Patent
Hirata

(10) Patent No.: US 7,976,260 B2
(45) Date of Patent: Jul. 12, 2011

(54) WORK HANDLING APPARATUS

(75) Inventor: Yasunari Hirata, Tokyo (JP)

(73) Assignee: Hirata Corporation, Tokyo (JP)

( * ) Notice: Subject to any disclaimer, the term of this patent is extended or adjusted under 35 U.S.C. 154(b) by 829 days.

(21) Appl. No.: 11/883,637

(22) PCT Filed: Mar. 15, 2005

(86) PCT No.: PCT/JP2005/005056
§ 371 (c)(1),
(2), (4) Date: Aug. 3, 2007

(87) PCT Pub. No.: WO2006/098039
PCT Pub. Date: Sep. 21, 2006

(65) Prior Publication Data
US 2008/0159834 A1   Jul. 3, 2008

(51) Int. Cl.
*B65H 5/00* (2006.01)
(52) U.S. Cl. ............. 414/222.01; 198/346.2; 198/346.3; 414/940; 901/7; 901/8
(58) Field of Classification Search ............ 414/222.01, 414/217, 940; 198/346.2, 346.3; 901/8, 901/7
See application file for complete search history.

(56) References Cited

U.S. PATENT DOCUMENTS

| | | | | |
|---|---|---|---|---|
| 4,706,372 A | * | 11/1987 | Ferrero et al. | 483/69 |
| 4,741,078 A | * | 5/1988 | Kimura | 29/39 |
| 5,161,936 A | * | 11/1992 | Kato | 414/728 |
| 5,310,039 A | * | 5/1994 | Butera et al. | 198/346.2 |
| 6,585,476 B1 | * | 7/2003 | Yi | 414/749.1 |
| 6,761,522 B2 | * | 7/2004 | Jäger | 414/222.01 |
| 7,264,432 B2 | * | 9/2007 | Wiggli et al. | 414/222.01 |
| 2002/0031424 A1 | | 3/2002 | Nakajima | |
| 2002/0092390 A1 | | 7/2002 | Nakajima | |
| 2006/0018737 A1 | * | 1/2006 | Wang et al. | 414/222.01 |

FOREIGN PATENT DOCUMENTS

| | | |
|---|---|---|
| JP | 1-321028 | 12/1989 |
| JP | 2000-117374 | 4/2000 |
| JP | 2002-148307 | 5/2002 |

* cited by examiner

*Primary Examiner* — Donald Underwood
(74) *Attorney, Agent, or Firm* — Wenderoth, Lind & Ponack, L.L.P.

(57) ABSTRACT

A work handling apparatus includes a pair of traveling guides (20, 20') provided so as to extend in a front-and-rear direction X at right and left sides, and a pair of direct-acting arms (30, 30') provided so as to travel independently on the pair of traveling guides. The direct-acting arms are extendable from contracted positions, at which the arms oppose each other and avoid mutual interference in a right-and-left direction Y, to extended positions at which the arms overlap with each other. An operation spot (41) is arranged in an operation area (40) sandwiched between the pair of traveling guides for performing a predetermined operation to a work. Also, work tools (60, 60') are attached to the pair of direct-acting arms (30, 30'), respectively, for transferring the work between a work storage area (50) and the operation spot (41) or performing an operation after transfer.

18 Claims, 18 Drawing Sheets

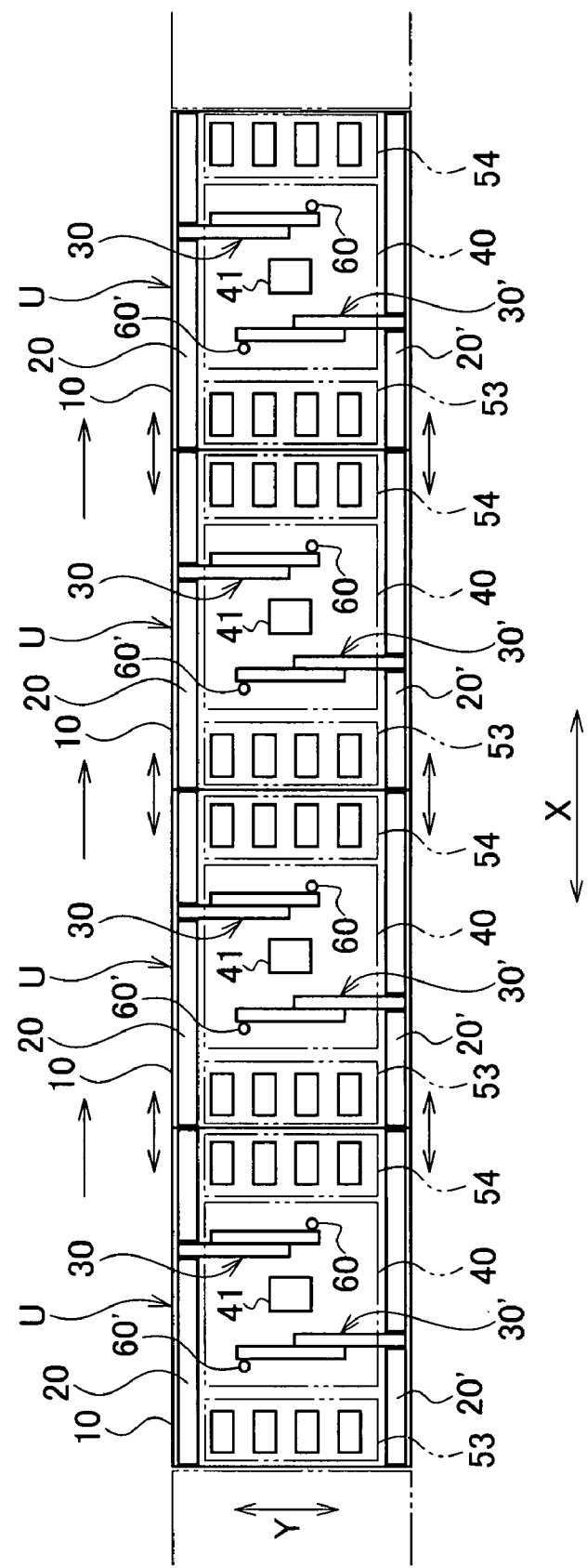

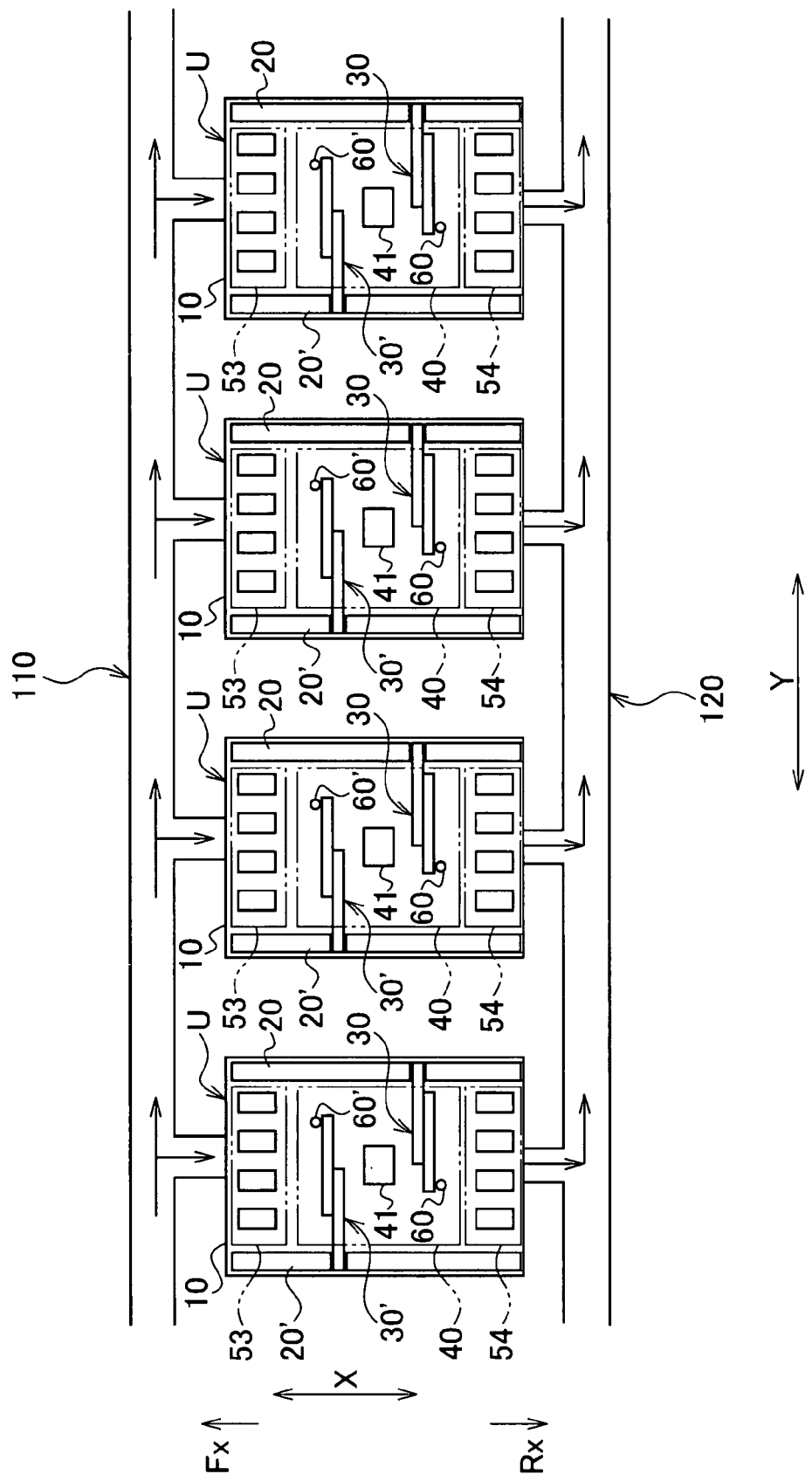

WORK HANDLING APPARATUS

BACKGROUND OF THE INVENTION

1. Technical Field

The present invention relates to a work handling apparatus for holding, transferring and positioning works when performing various operations including processing such as coating, heat processing, chemical processing and cleaning, inspection, measurement, machining and assembly for the works including electronic parts such as a semiconductor chip or substrate, or machine parts.

2. Description of the Related Art

As a known handling apparatus in the related art for loading and unloading works such as semiconductor chips with respect to an inspection area, for example, there is an apparatus including two transfer channels for transferring a work, two transfer hands being capable of adsorbing the work and reciprocating in a lateral horizontal direction (right-and-left direction) orthogonal to a transfer direction of the two transfer channels and the vertical direction, and inspection sockets arranged at midsections of the two transfer channels, in which the two transfer hands move in the right-and-left direction simultaneously for replacing the works with respect to the inspection sockets (for example, Unexamined Japanese Patent Publication JP2002-148307).

However, the transfer hands in this apparatus transfer the works two-dimensionally within a vertical plane and do not transfer the works two-dimensionally within a horizontal plane.

On the other hand, as a handling apparatus for transferring works two-dimensionally in the horizontal plane, there is a known apparatus including two traveling channels formed respectively on the left and right sides so as to be extended in a front-and-rear direction, a work (IC chip) storage unit arranged in the front of the apparatus, a test unit arranged at the rear of the apparatus for conducting a test for works (IC chips), a loading mechanism reciprocating in the front-and-rear direction while being guided by the left traveling channel for loading the works (IC chips), an unloading mechanism reciprocating in the fore-and-aft direction while being guided by the right traveling channel for unloading the works (IC chips), in which the loading mechanism loads uninspected works from the work storage unit to the test unit and the unloading mechanism unloads inspected works from the test unit to the work storage unit (for example, Unexamined Japanese Patent Publication JP2002-174658).

However, in this apparatus, the loading mechanism travels only within a left side area for transferring the works and the unloading mechanism travels only within a right side area for transferring the works. That is, since the loading mechanism and the unloading mechanism are formed so as to travel their own areas (the left side area and the right side area) arranged at a distance to a certain degree in the direction of the horizontal plane in order to avoid mutual interference, it is difficult to arrange the loading mechanism and the unloading mechanism intensively near the center, and hence a relatively large space is necessary for installing this apparatus in a semiconductor manufacturing line or the like. Because of inevitable upsizing, the traveling distance for transferring the work is elongated as well, whereby the time period required for conducting a predetermined inspection after the work is loaded in the inspection area and unloading the works having completed the inspection to the predetermined area again is elongated, so that improvement of the productivity is difficult.

SUMMARY OF THE INVENTION

In view of such circumstances, it is an object of the present invention to provide a work handling apparatus which is capable of performing efficiently various operations including processing such as coating, heat processing, chemical processing and cleaning, inspection, measurement, machining and assembly for works including electronic parts such as a semiconductor chip or substrate, or machine parts while achieving simple structure, aggregation of respective mechanisms, downsizing of entirety of the apparatus, saving of an installation area and reduction of time required for transferring works, so that the productivity is improved.

In order to achieve the above-described object, a work handling apparatus according to a first aspect of the present invention includes a pair of traveling guides provided so as to extend in a front-and-rear direction at right and left sides, a pair of direct-acting arms provided so as to travel independently on the pair of traveling guides and are extendable from contracted positions at which the pair of direct-acting arms oppose to each other and avoid mutual interference in the right-and-left direction to extended positions at which the pair of direct-acting arms overlap with each other, an operation spot arranged in an operation area sandwiched between the pair of traveling guides for performing a predetermined operation to a work, and work tools attached to the pair of direct-acting arms respectively for transferring the work between a predetermined position and the operation spot or performing an operation after transfer.

According to this structure, the pair of direct-acting arms reciprocate in the front-and-rear direction while being guided by the respective traveling guides and, simultaneously, can contract so as to avoid mutual interference when going by each other in the case of transferring the work between the predetermined position and the operation spot while holding the work by the work tools, so that a free transfer operation without mutual constraint is achieved. Since the pair of direct-acting arms are a type moving directly (moving linearly), the arms can perform the action to avoid interference quickly in comparison with the arms of a type which are bent or rotated. Consequently, the transfer efficiency is improved, and hence the productivity of the work is improved. In addition, the pair of direct-acting arms are formed so as to overlap with each other when extending in the right-and-left direction, that is, the ranges of movement of the pair of direct-acting arms are formed so as to overlap with each other within an operation area sandwiched by the pair of traveling guides, whereby an aggregated structure is resulted, and hence the width reduction in the right-and-left direction and downsizing of the apparatus are achieved. Also, the operation spot may be arranged at any position as long as it is within the range in which the pair of direct-acting arms can be moved in an overlapped manner, That is, in the operation area, and when a plurality of the operation spots are arranged, various types of operation can be performed.

In the apparatus according to the first aspect, the work tools may include main bodies to be detachably attached respectively on the pair of direct-acting arms and elevation grip hands connected to the main bodies so as to be capable of elevating in a vertical direction for gripping the work.

According to this structure, after the direct-acting arms are moved in the front-and-rear direction and the right-and-left direction to position the work tools at predetermined positions, the elevation grip hands can elevate with respect to the main bodies to take out or release the work, so that a smooth, linear and quick operation is enabled, and hence reduction of the transfer time is achieved.

In the apparatus according to the first aspect, the work tools may include main bodies to be detachably attached respectively on the pair of direct-acting arms and an operation tool unit connected to the main bodies so as to be capable of elevating in a vertical direction for holding the work and performing the operation.

According to this structure, after the direct-acting arms move in the front-and-rear direction and the right-and-left direction to position the work tools holding the work at the operation spot, the operation tool unit (for example, a socket or the like for adsorbing and holding by fitting a bolt therein) moves downward with respect to the main bodies and is activated (by a drive source), an operation (for example, tightening of the bolt) can be applied to the work, so that the transfer operation may be followed by a predetermined operation, and hence reduction of processing time from the transfer to the operation is achieved.

In the apparatus according to the first aspect, a work storage area in adjacent to the operation area for storing the works temporarily in order to load and unload the works may be provided in adjacent to the operation area.

According to this structure, the pair of direct-acting arms can transfer untreated works and treated works between the work storage area and the operation spot while holding the work with the work tools.

In the apparatus configured as described above, the work storage area may include a front-and-rear movement mechanism for moving the work in the front-and-rear direction and a right-and-left movement mechanism for moving the work in the right-and-left direction.

According to this structure, since the works (or a tray in which a plurality of the works are stored) can be replaced in the front-and-rear direction and the right-and-left direction by the front-and-rear movement mechanism and the right-and-left movement mechanism in the work storage area, storage, waiting or selection of the works (or the tray) can be performed easily by the replacement of the untreated works (or the tray in which the untreated works are stored) and the treated works (or the tray in which the treated works are stored).

In the apparatus configured as described above, the work storage area may be arranged on one end side of the operation area in the front-and-rear direction.

According to this structure, for example, when an operator loads and unloads the tray or the like in which the works are stored with respect to the work storage area, the operator is able to perform loading and unloading operations from the one end side of the operation area in the front-and-left direction.

In the apparatus configured as described above, the work storage area may include a work loading area for loading and storing untreated works and a work unloading area for storing treated works to be unloaded, and the work loading area and the work unloading area may be arranged respectively on both end sides in the front-and-rear direction with the operation area sandwiched therebetween.

According to this structure, the pair of direct-acting arms can load the untreated works from the work loading area to the operation spot and unload the treated works from the operation spot to the work unloading area through the independent transfer operations while holding the works with the work tools.

In the apparatus according to the first aspect, the tool storage area for replaceably storing various types of work tools corresponding to various types of works may be provided in adjacent to the operation area.

According to this structure, for example, when a type of the work is changed and hence the holding mode is changed, the pair of direct-acting arms can move to the tool storage area to replace the work tools with those corresponding to the new work. Therefore, in the case of the operation for mounting a plurality of sub-works on a main work, the main work is loaded to the operation spot, by one work tool, and then the work tool is replaced as needed, whereby the sub-works are loaded to the operation spot, where the assembly operation can be performed. In this manner, all of the operation processes for the product can be performed with a single apparatus.

In the apparatus according to the first aspect, each of the pair of direct-acting arms may include a first arm which travels on the traveling guide in the front-and-rear direction and at least one extendable arm provided so as to extend and contract in the right-and-left direction with respect to the first arm.

According to this structure, since mutual interference can be prevented only by contracting the extendable arms when moving the pair of drive-acting arms in the front-and-rear direction, a smooth movement of the entire direct-acting arms is achieved. Since each of the pair of direct-acting arms includes the first arm and at least one extendable arm, a simple structure is achieved.

In the apparatus configured as described above, the extendable arm may be provided with a plurality of work tools.

According to this structure, when a plurality of work tools are of the same type, a plurality of works of the same type can be transferred at the same time, while when a plurality of work tools are of the different types, the different types of works can be transferred at the same time. Alternatively, only corresponding works can be transferred using only the work tools corresponding to the works or a predetermined position where the works are stored. When the different types of works (for example, the main work and a plurality of sub-works) are transferred at the same time, the sub-works can be assembled continuously in sequence to the main work without returning to the work storage area for each work, so that the reduction of the transfer time and the operation time and improvement of efficiency of the same is achieved.

In the apparatus configured as described above, each of the extendable arms may be provided with a disk-shaped rotating disk, and the rotating disk may be provided with a plurality of work tools in a circumferential direction.

According to this structure, the positional relationship between the work and the operation spot, or the corresponding relationship between the work and the work tools can be selected for positioning by rotating the rotating disk, so that the smooth transfer operation is enabled.

In the apparatus configured as described above, the extendable arm included in one of the pair of direct-acting arms and the extendable arm included in the other one of the pair of direct-acting arms may be arranged at different heights in the vertical direction.

According to this structure, mutual interference can be prevented without contracting the extendable arms completely to the contracted position when the pair of direct-acting arms go by during the movement in the front-and-rear direction. Consequently, the contracting operation for preventing interference is no longer necessary partly or completely, so that the transfer operation can be performed further smoothly.

In the apparatus according to the first aspect, the operation spot may be provided with a rotating table having a plurality of work holding units arranged in a circumferential direction, and the rotating table may be formed so as to position the work holding units simultaneously at a work loading position where the direct-acting arms load the work, a work operating position where an operation is applied to the work and a work unloading position where the direct-acting arms unload the work by rotating by a predetermined angle.

According to this structure, the rotating table functions as an index table and the work positioning operations to the work loading position, the work operating position and the work unloading position are performed simultaneously. Therefore, there is no waiting time and hence the productivity can be further improved (high throughput is achieved).

In order to achieve the above-described object, a work handling apparatus according to a second aspect of the present invention includes an operation unit including a pair of traveling guides provided so as to extend in a front-and-rear direction at right and left sides, a pair of direct-acting arms provided so as to travel independently on the pair of traveling guides and are extendable from contracted positions at which the pair of direct-acting arms oppose to each other and avoid mutual interference in the right-and-left direction to extended positions at which the pair of direct-acting arms overlap with each other, an operation spot arranged in an operation area sandwiched between the pair of traveling guides for performing a predetermined operation to the work, a work storage area arranged in adjacent to the operation area for storing the works temporarily in order to load and unload the works, and work tools attached respectively to the pair of direct-acting arms for transferring the works between the work storage area and the operation spot or for performing the operation after transfer, and a connecting and transferring mechanism for transferring the works by connecting the operation units next to each other in a state in which a plurality of operation units are arranged.

According to this structure, since a series of related operations can be performed continuously for the works by transferring the work from the operation unit on an upstream side to the operation unit on a downstream side in sequence via the connecting and transferring mechanism, the operation can be automated, so that the productivity can be improved.

In the apparatus according to the second aspect, a plurality of the operation units may be arranged in the front-and-rear direction, and the connecting and transferring mechanism may connect the operation units with respect to each other in series.

According to this structure, since the plurality of operation units can be arranged and mutually connected in the front-and-rear direction (the extending direction of the traveling guides) with a single linear connecting and transferring mechanism, width reduction and aggregation of the apparatus are achieved.

In the apparatus in which the serial connection is employed, the work storage area may include a work loading area for loading and storing works and a work unloading area for storing the works to be unloaded which are arranged on both end sides in the front-and-rear direction with the operation area sandwiched therebetween, and the connecting and transferring mechanism may connect the work unloading area of the operation units positioned on an upstream side and the work loading area of the operation unit located on a downstream side.

According to this structure, the works having completed the operation by the operation unit on the upstream side is transferred from the work unloading area to the work loading area of the operation unit on the downstream side via the connecting and transferring mechanism, where the operation by the operation unit is performed. In this manner, a series of operations can be performed while transferring the works from the operation unit on the upstream side to the operation unit on the downstream side in sequence via the connecting and transferring mechanism.

In the apparatus according to the second aspect, a plurality of the operation units may be connected directly and arranged in the front-and-rear direction, the pair of direct-acting arms included in each operation unit may serve as the connecting and transferring mechanism.

According to this structure, since the pair of direct-acting arms included in each operation unit serve as the connecting and transferring mechanism for transferring the works, that is, are capable of being transferred to another operation unit, a specific connecting and transferring mechanism is no longer necessary, so that the structure can be simplified and the aggregation and downsizing of the apparatus is achieved.

In the apparatus according to the second aspect, a plurality of the operation units may be directly connected and arranged in the front-and-rear direction, the work storage area may include a work loading area for loading and storing the works and a work unloading area for storing the works to be unloaded which are arranged respectively on both end sides in the front-and-rear direction with the operation area sandwiched therebetween, and the work loading area or the work unloading area also may serve as the connecting and transferring mechanism.

According to this structure, since the work loading area or the work unloading area included in each operation unit serves as the connecting and transferring mechanism for transferring the works, a specific connecting and transferring mechanism is no longer necessary, so that the structure can be simplified and the aggregation and downsizing of the apparatus is achieved.

In the apparatus according to the second aspect, a plurality of the operation units may be arranged in the right-and-left direction, and the connecting and transferring mechanism may connect the operation units mutually in parallel.

According to this structure, since the connecting and transferring mechanism can be arranged on the front side and/or the rear side of the operation unit while arranging the plurality of operation units in the right-and-left direction (the extending direction of the direct-acting arms), a flexible layout is achieved.

In the apparatus in which the parallel connection is employed, the work storage area may include a work loading area for loading and storing the works and a work unloading area for storing the works to be unloaded which are arranged on both end sides in the front-and-rear direction with the operation area sandwiched therebetween, and the connecting and transferring mechanism may include a connecting and loading mechanism for mutually connecting the work loading areas included in the operation units next to each other and a connecting and unloading mechanism for mutually connecting the work unloading areas included in the operation units next to each other.

According to this structure, when the same operation is performed in respective operation units, it is possible to load the works from the connecting and loading mechanism to the respective operation units and unload the works in sequence from the operation unit having completed the operation via the connecting and unloading mechanism. Therefore, an efficient operation and transfer are achieved as a whole, and hence the productivity can be improved. It is also possible to achieve an efficient production and the production cost can be reduced by adjusting the number of the operation units to be installed according to the increase or decrease of the throughput.

BRIEF DESCRIPTION OF THE DRAWINGS

FIG. 17 is a plan view showing another embodiment of the work handling apparatus according to the second aspect of the present invention.

FIG. 18 is a plan view showing still another embodiment of the work handling apparatus according to the second aspect of the present invention.

DETAILED DESCRIPTION OF THE INVENTION

Figure 1:
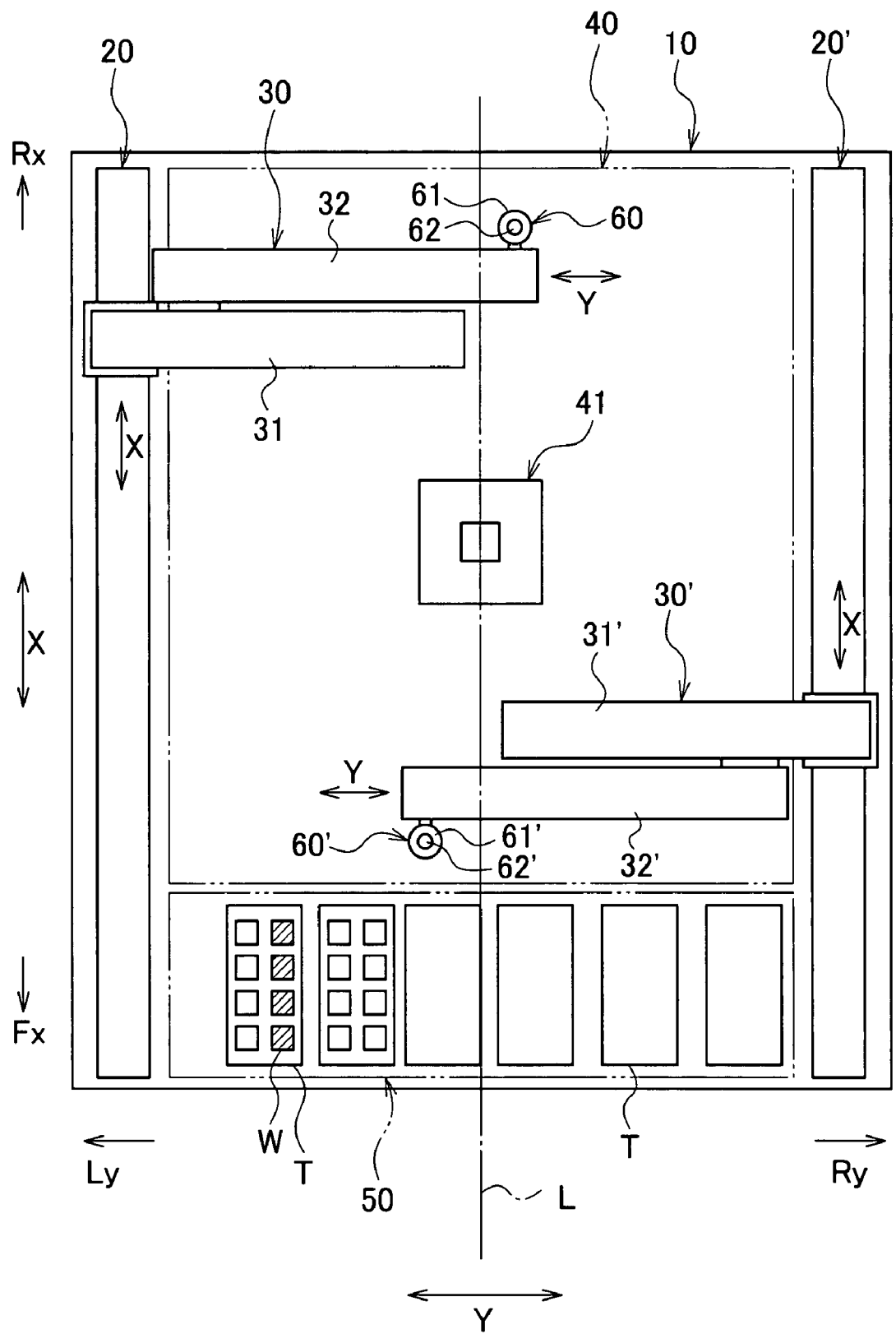
FIG. 1 is a plan view of a work handling apparatus according to an embodiment of the present invention.

Referring now to the attached drawings, the present invention will be described.

As shown in FIG. 1 to FIG. 4, a work handling apparatus includes a substantially rectangular base 10, a pair of traveling guides 20, 20' provided so as to extend in a front-and-rear direction X at a left side Ly and a right side Ry on the base 10, a pair of direct-acting arms 30, 30' provided so as to travel on the respective traveling guides 20, 20' independently, an operation spot 41 arranged substantially at the center (an area passing through a centerline L) in an operation area 40 sandwiched between the pair of traveling guides 20, 20', a work storage area 50 arranged in the front Fx of the base 10 adjacently to the operation area 40, and work tools 60, 60' mounted respectively on the pair of direct-acting arms 30, 30'.

The pair of traveling guides 20, 20' serve to guide the direct-acting arms 30, 30' respectively in the front-and-rear direction X independently. Therefore, the traveling guides 20, 20' may be of various structure such as guide rails, guide screws, or guide grooves as long as they extend in the front-and-rear direction X and guide the direct-acting arms 30, 30'.

Besides, the pair of traveling guides 20, 20' is provided with stoppers (not shown) for restricting the movement of the direct-acting arms 30, 30' at both ends thereof.

The pair of direct-acting arms 30, 30' include first arms 31, 31' formed to extend in the right-and-left direction Y by a predetermined length and guided directly by the traveling guides 20, 20', and extendable arms 32, 32' provided so as to be capable of extending and contracting in the right-and-left direction Y with respect to the first arms 31, 31'.

The pair of direct-acting arms 30, 30' travel on the pair of traveling guides 20, 20' in the front-and-rear direction X independently and are extendable from contracted positions at which the pair of direct-acting arms oppose each other and avoid mutual interference in the right-and-left direction Y (for example, the contracted position shown in FIG. 4) to extended positions at which the pair of direct-acting arms overlap with each other (for example, the extended position shown in FIG. 2), so that the work tools 60, 60' provided at the tip ends can be moved substantially over the entire area of the operation area 40.

Besides, each of the extendable arms 32, 32' is not limited to be formed of a single arm, but may include a plurality of arms which are extendable in multiple steps.

A drive mechanism for causing the pair of direct-acting arms 30, 30' to move in the front-and-rear direction X and extend in the right-and-left direction Y may be of various drive mechanisms in which an electromagnetic actuator such as a DC motor or a stepping motor or a lead screw is used.

The operation area 40 is formed in an area sandwiched between the pair of traveling guides 20, 20' on the base 10 and includes at least one operation spot 41 for applying a predetermined operation to a work W. The operation spot 41 is arranged substantially at the center position (the center position in the front-and-rear direction X and the right-and-left direction Y) on the centerline L as shown in FIG. 1.

Besides, the place of arrangement of the operation spot 41 is not limited to the center area, but it is preferable to arrange it at the center area in order to enable the respective direct-acting arms 30, 30' to transfer the work W in a shortest distance.

The work storage area 50 is arranged in the front Fx adjacent to the operation area 40 as shown in FIG. 1, so that a plurality of trays T carrying the works W can be arranged in the right-and-left direction Y. Here, since the work storage area 50 is arranged on the front side Fx (one end side) in the front-and-rear direction X with respect to the operation area 40, an operator is able to perform loading and unloading operations easily from the front side Fx, for example, when loading and unloading the trays T in which the works W are stored with respect to the work storage area 50.

Figure 2:
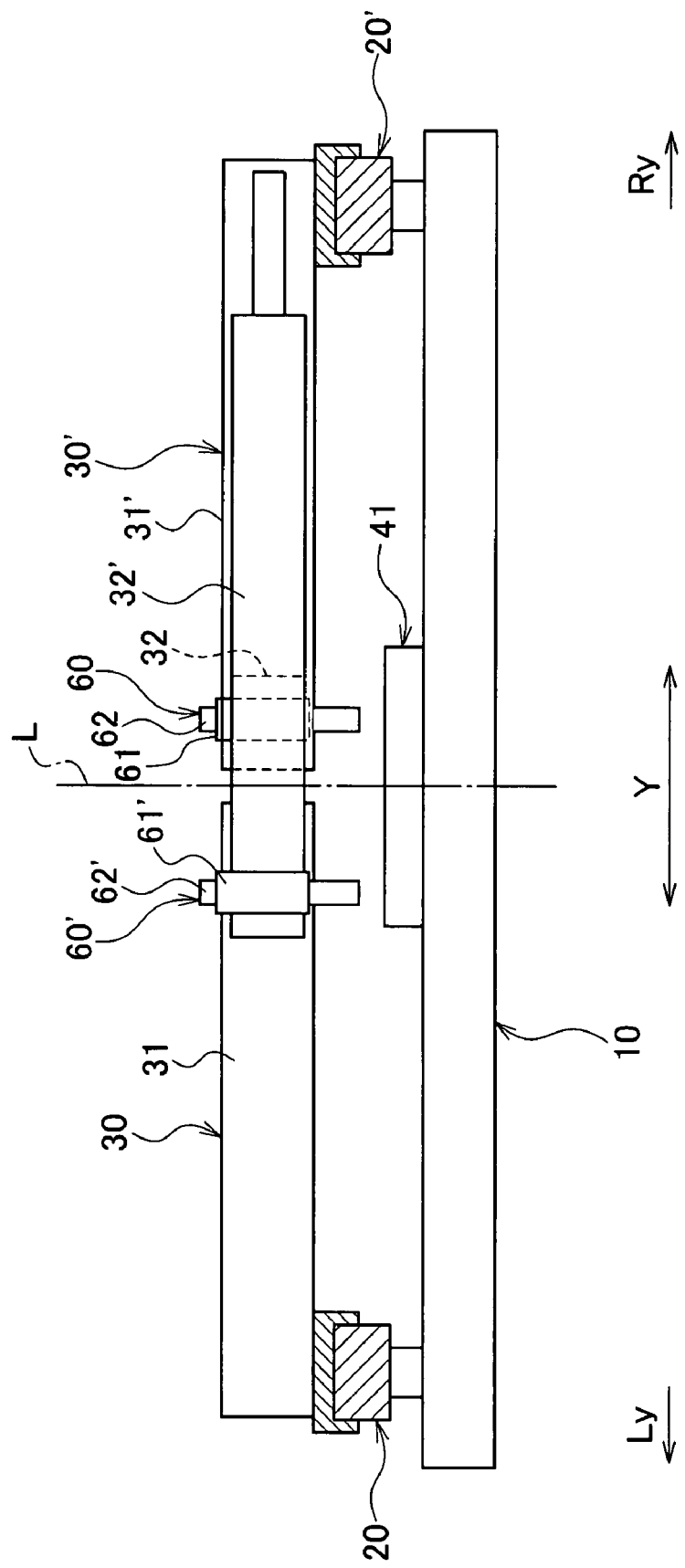
FIG. 2 is a front view of the work handling apparatus shown in FIG. 1.
Figure 3:
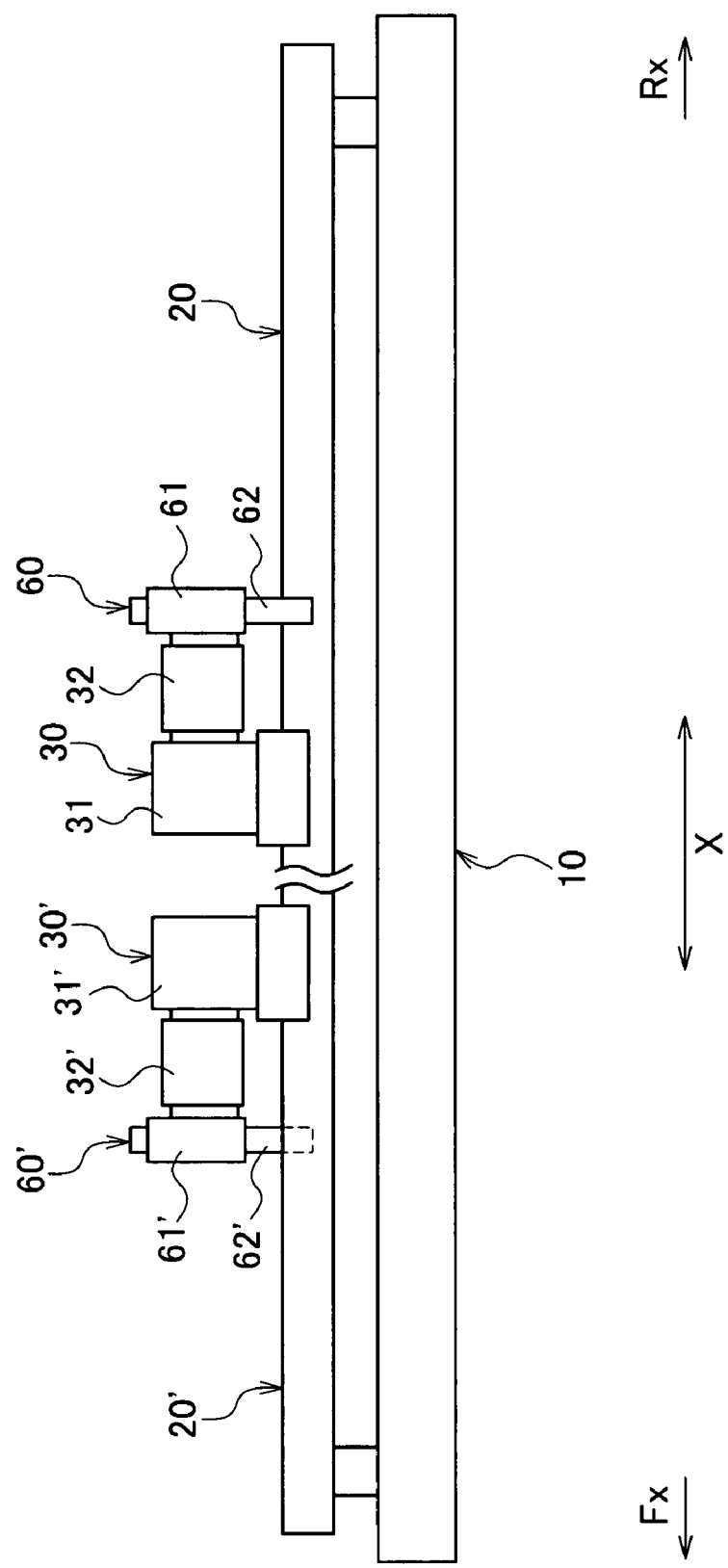
FIG. 3 is a right side view of the work handling apparatus shown in FIG. 1.

As shown in FIG. 1 to FIG. 3, the work tools 60, 60' include main bodies 61, 61' to be detachably attached to tip end areas of the extendable arms 32, 32' of the direct-acting arms 30, 30' and elevation grip hands 62, 62' connected to the main bodies 61, 61' so as to be capable of elevating in the vertical direction for gripping the work W at the lower ends thereof (or operation tool units connected to the main bodies 61, 61' so as to be capable of elevating in the vertical direction for performing the operation while holding the work and a drive source therefor).

When the direct-acting arms 30, 30' move in the front-and-rear direction X and the right-and-left direction Y so that the work tools 60, 60' are positioned at the work storage area 50 or the operation spot 41 and the elevation grip hands (or the operation tool units) 62, 62' perform the elevating motion as needed with respect to the main bodies 61, 61' to take an untreated work W out from the tray T in the work storage area 50 and hold the untreated work W, transfer the untreated work W to the operation spot 41 while maintaining the work W in the held state so as not to be dropped off during the loading operation of the direct-acting arms 30, 30' and position the untreated work W at a predetermined position (or perform the operation simultaneously with positioning). On the other hand, the elevation grip hands 62, 62' take a treated work W out from the operation spot 41 and hold the work W, transfer the treated work W to the tray T in the work storage area 50 while maintaining the treated work W in the held state during the unloading operation of the direct-acting arms 30, 30', store the treated work W thereon and release the holding state. Accordingly, a smooth and linear quick operation is enabled, so that reduction of the transfer time is achieved.

The work tools 60, 60' having the elevation grip hands 62, 62' are not limited to the grip hands of a type which clamp the work W and various structures such as an adsorption pad that adsorbs the work W as long as they can hold the work W securely may also be employed. The work tools 60, 60' having the operation tool units 62, 62' may be of various structures such as a socket or a screw driver capable of holding a bolt or a nut by fitting or adsorbing and capable of tightening the bolt or the nut as long as it may perform a predetermined operation (such as fastening or assembly) at the operation spot 41 while holding the work W securely.

An example of the operation of this apparatus will be described. The one direct-acting arm 30 takes an untreated work W out from the tray T in the work storage area 50 and holds the untreated work W with the work tool 60, loads the untreated work W to the operation spot 41, positions the untreated work W at the operating position, and then releases and waits in the vicinity of the operation spot 41. On the other hand, the other direct-acting arm 30' takes an untreated work W out from the tray T in the work storage area 50 and holds the untreated work W with the work tool 60', loads the untreated work W to a position in the vicinity of the operation spot 41 and waits.

When the operation is completed, the one direct-acting arm 30 takes out the treated work W from the operation spot 41 and holds the treated work W by the work tool 60 and unloads the treated work W at the work storage area 50, stores the treated work W on the tray T for treated works and releases the treated work W. On the other hand, the other direct-acting arm 30', which has been waiting in the vicinity of the operation spot 41, loads the untreated work W held thereby to the operation spot 41, positions the untreated work W at the operating position and releases the untreated work W.

The pair of direct-acting arms 30, 30' repeat this transfer sequence consecutively for loading and unloading the target works W.

Figure 4:
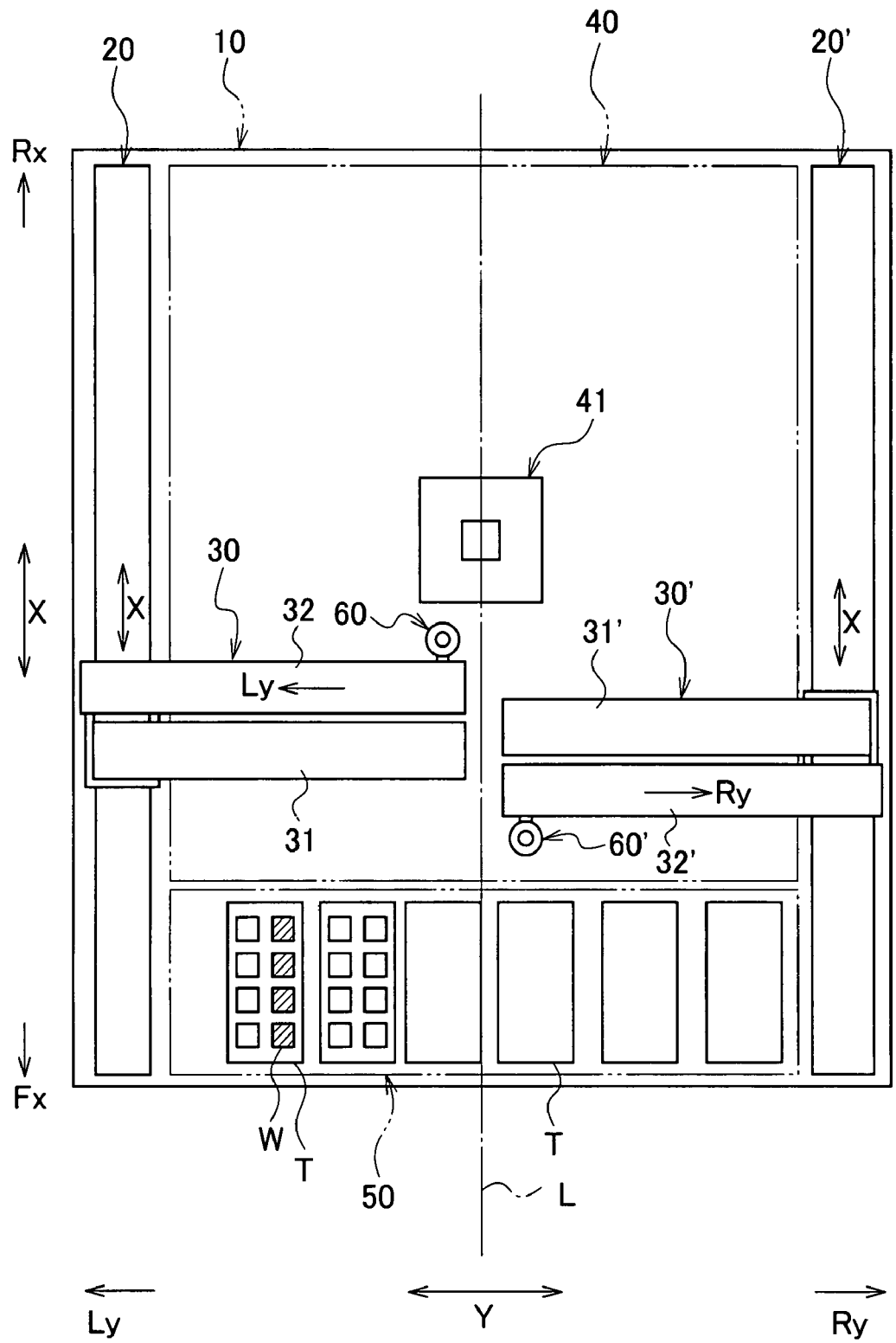
FIG. 4 is a plan view showing a state in which a pair of direct-acting arms of the work handling apparatus shown in FIG. 1 is moved.

During the transfer (loading and unloading) operation between the work storage area 50 and the operation spot 41, the pair of direct-acting arms 30, 30' reciprocate in the front-and-rear direction X while being guided by the pair of traveling guides 20, 20' respectively and, simultaneously, contract as shown in FIG. 4 so as to avoid mutual interference when going by each other, so that free transfer operation is enabled without being constrained from each other, whereby the transfer time (the time required for handling) can be reduced, and hence the transfer efficiency is improved and consequently, the productivity of the works to be treated is improved.

Since the pair of direct-acting arms 30, 30' are formed so as to overlap with each other when extending in the right-and-left direction Y, that is, so that the ranges of movement of the pair of direct-acting arms 30, 30' overlap with each other within the operation area 40 sandwiched between the pair of traveling guides 20, 20', the intensive structure is achieved, so that a reduction of the width and downsizing of the apparatus in the right-and-left direction Y is achieved. The operation spot 41 may be arranged at any position within the operation area 40 in which the pair of direct-acting arms 30, 30' are movable in an overlapped manner, and hence a plurality of the operation spots 41 may be provided so that various types, of operation may be performed.

The work handling apparatus described above, may be applied when the works W are transferred between the predetermined position (work storage area 50) and the operation spot 41 in order to perform various operations such as processing, inspection, measurement and machining with respect to various types of works W such as the electronic parts or the machine parts.

Figure 5:
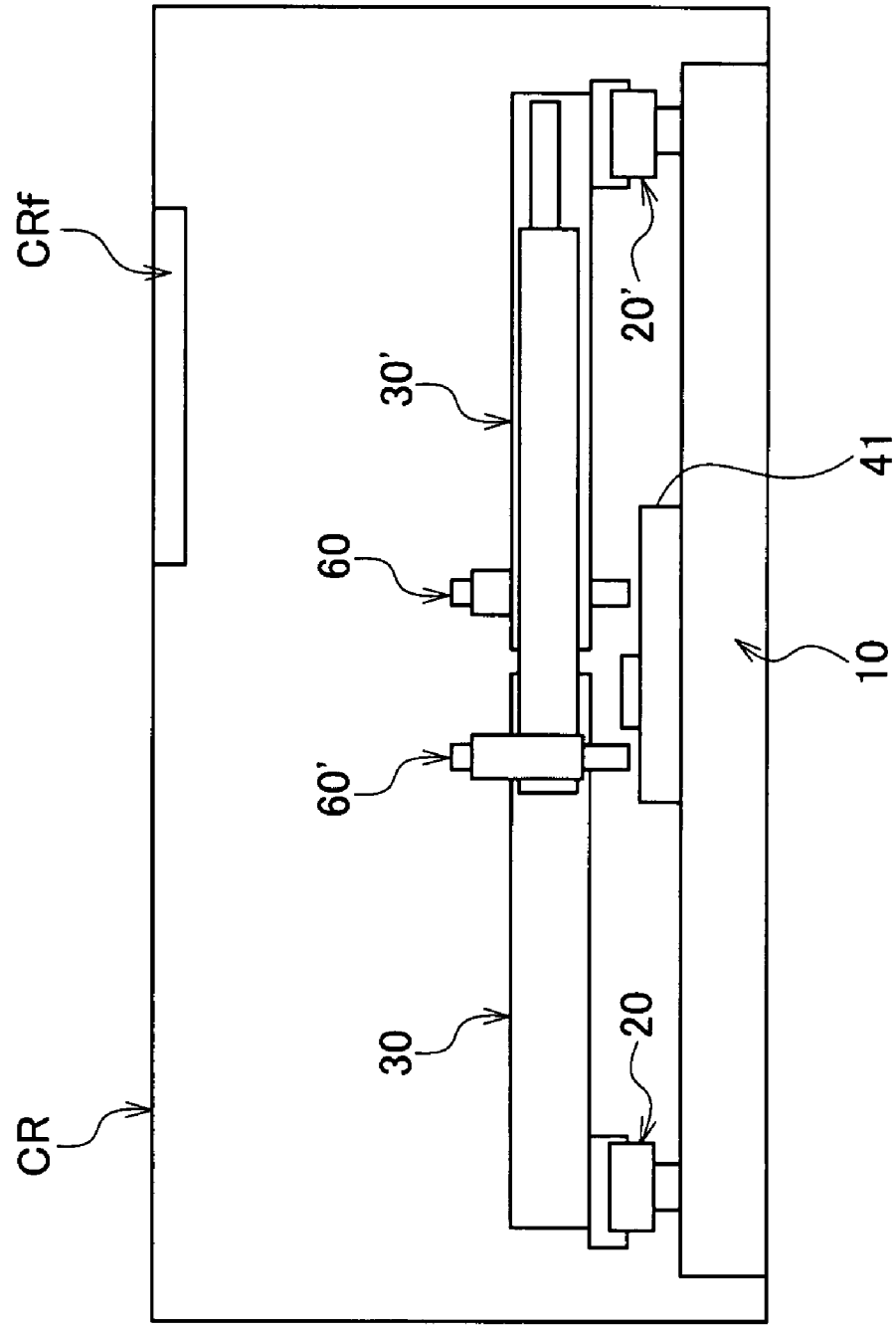
FIG. 5 is a front view showing a state in which the work handling apparatus according to the present invention is applied to a clean room.

FIG. 5 shows a case in which the work handling apparatus is applied in a clean room CR for a semiconductor manufacturing line as an example. That is, this apparatus is arranged within the clean room CR provided with a cleaning filter CRf as shown in FIG. 5 and transfers the works W efficiently between a predetermined position and the operation spot in order to perform various types of processing for manufacturing a semiconductor to the works W (semiconductor parts in this case).

Accordingly, the productivity may be improved while achieving aggregation and space reduction of the semiconductor manufacturing line.

Figure 6:
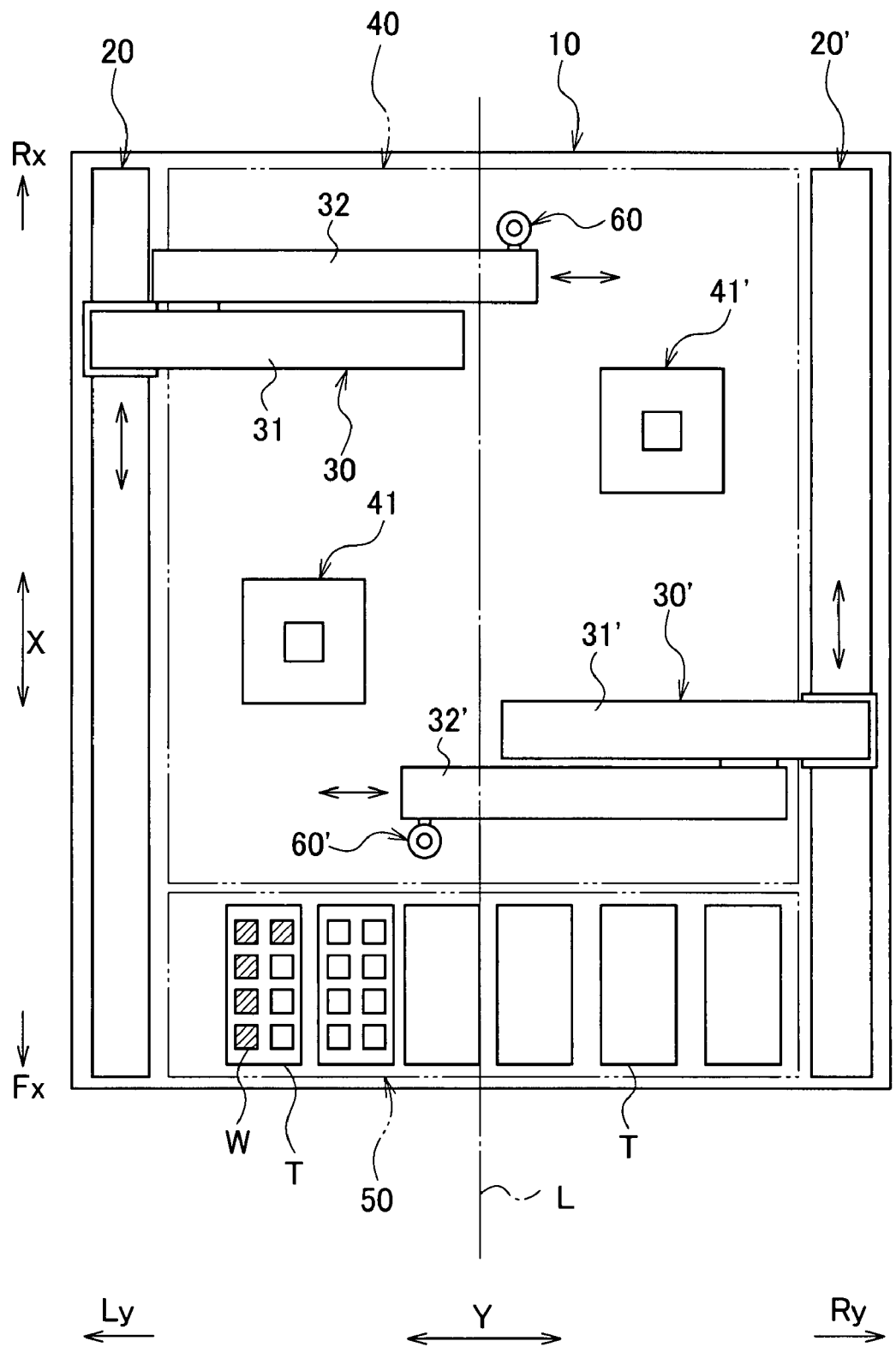
FIG. 6 is a plan view of the work handling apparatus according to another embodiment of the present invention.

FIG. 6 shows another embodiment of the work handling apparatus according to the first aspect of the present invention. In this apparatus, as shown in FIG. 6, two operation spots 41, 41' are provided in the operation area 40 sandwiched between the pair of traveling guides 20, 20'.

That is, in this apparatus, a predetermined operation may be performed for the two works W simultaneously in such a manner that the one direct-acting arm 30 performs transfer (loading and unloading) operation of a work W between the work storage area 50 and one operation spot 41 and between the work storage area 50 and the other operation spot 41' and independently of this transfer operation, the other direct-acting arm 30' performs transfer (loading and unloading) operation of a work W between the work storage area 50 and the one operation spot 41 and between the work storage area 50 and the other operation spot 41'. In this manner, two or more of the operation spots 41 can be arranged within the range in which the pair of direct-acting arms 30, 30' move in an overlapped manner, and hence various types of operation can be performed as needed, whereby the productivity is improved.

In this transfer operation, since the pair of direct-acting arms 30, 30' reciprocate in the front-and-rear direction X while extending and contracting as needed in the right-and-left direction Y respectively, mutual interference when the pair of direct-acting arms 30, 30' go by can be prevented, and hence the pair of direct-acting arms 30, 30' can transfer the work W efficiently while moving the shortest distance between the work storage area 50 and the operation spots 41, 41'.

Figure 7:
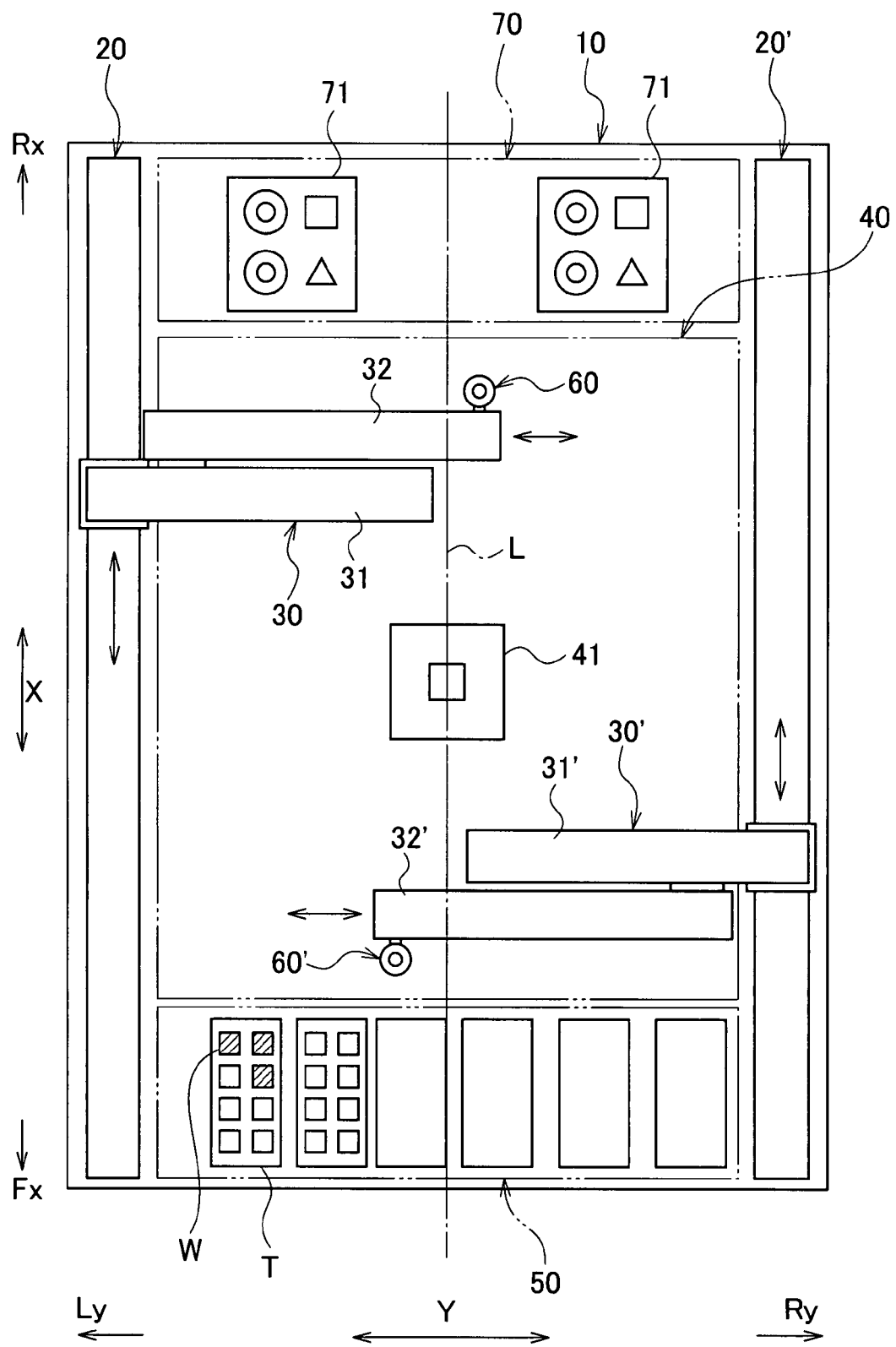
FIG. 7 is a plan view of the work handling apparatus according to still another embodiment of the present invention.

FIG. 7 shows still another embodiment of the work handling apparatus according to the first aspect of the present invention, in which a tool storage area 70 is provided to the aforementioned embodiment.

That is, in this apparatus, as shown in FIG. 7, the work storage area 50 is arranged in adjacent to the front side Fx of the operation area 40 and the tool storage area 70 is arranged in adjacent to the rear side Rx of the operation area 40 on the base 10 in the front-and-rear direction X.

Figure 8A:
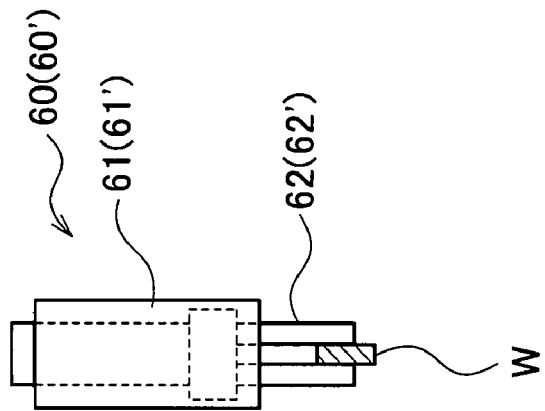
FIG. 8A, FIG. 8B and FIG. 8C are side views showing work tools different from each other.
Figure 8B:
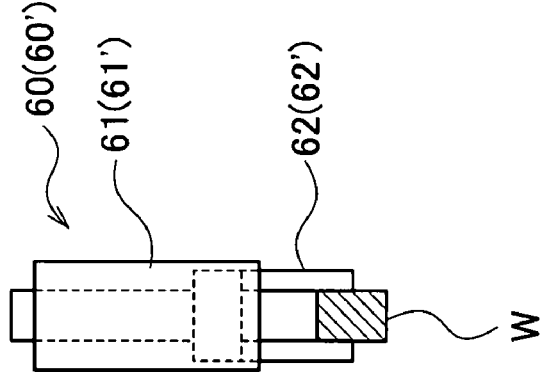
Figure 8C:
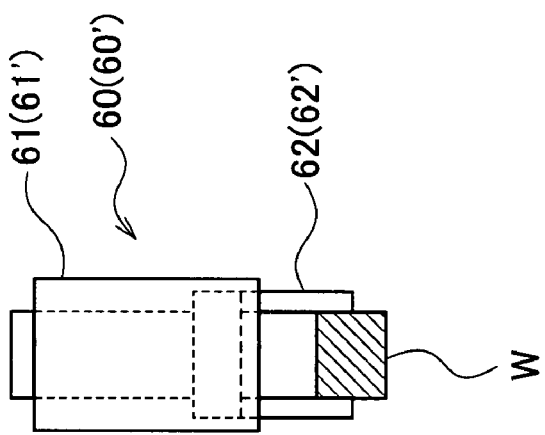

The tool storage area 70 is provided with a plurality of tool holding units 71 in which a plurality of different types of work tools 60, 60' are stored. As shown in FIG. 8A to FIG. 8C, the work tools 60, 60' may be prepared in advance so as to have elevation grip hands 62 (62') according to the width of the work W or so as to have operation tool units (not shown) corresponding to various types of works W.

In this manner, by the provision of the tool storage area 70 for replaceably storing the various types of work tools 60, 60' corresponding to the various types of work W in adjacent to the operation area 40, for example, when the type of the work W is changed, and hence the holding mode is changed, the pair of direct-acting arms 30, 30' may be moved to the tool storage area 70 to replace the work tools 60, 60' with other work tools 60, 60' corresponding to a new work W immediately.

Therefore, for example, in the case of the operation for mounting a plurality of sub-works W on a main work W, the main work W is loaded to the operation spot 41 by one pair of the work tools 60, 60' and then the work tools 60, 60' are replaced as needed, and whereby the sub-works W are loaded to the operation spot 41, where the assembly operation is performed. In this manner, the entire operation processes for the product may be performed with a single apparatus.

Figure 9A:
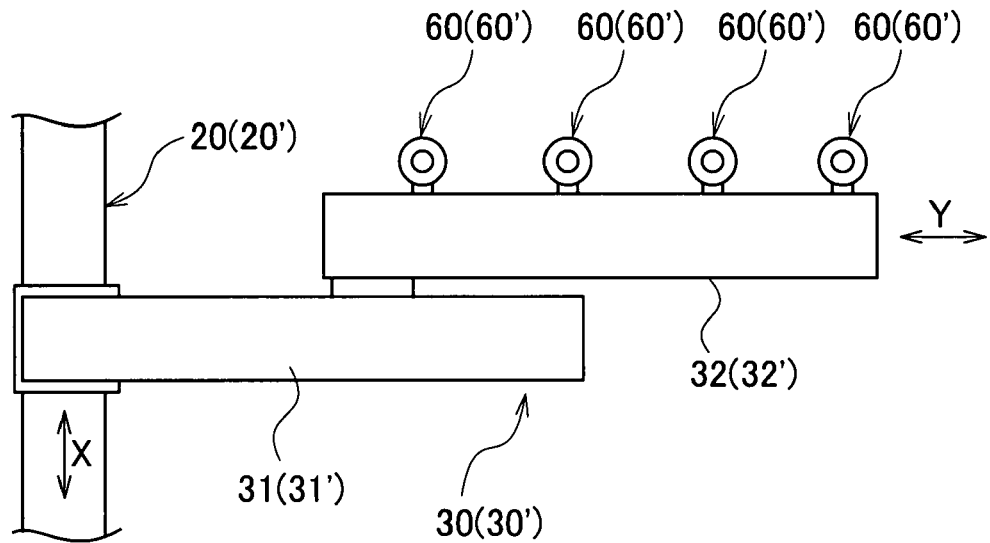
FIG. 9A and FIG. 9B are partial plan views of the direct-acting arm according to another embodiment of the present invention.
Figure 9B:
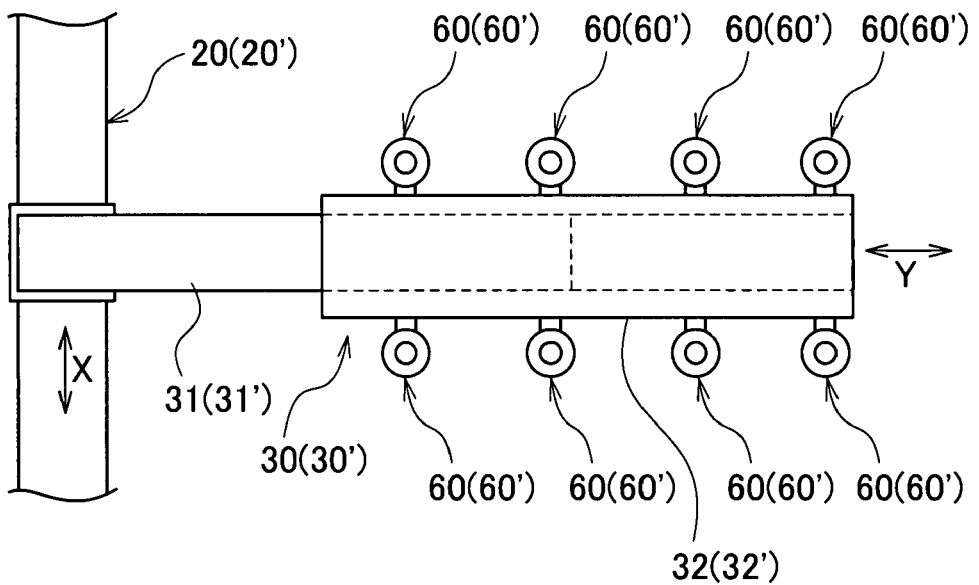
Figure 10:
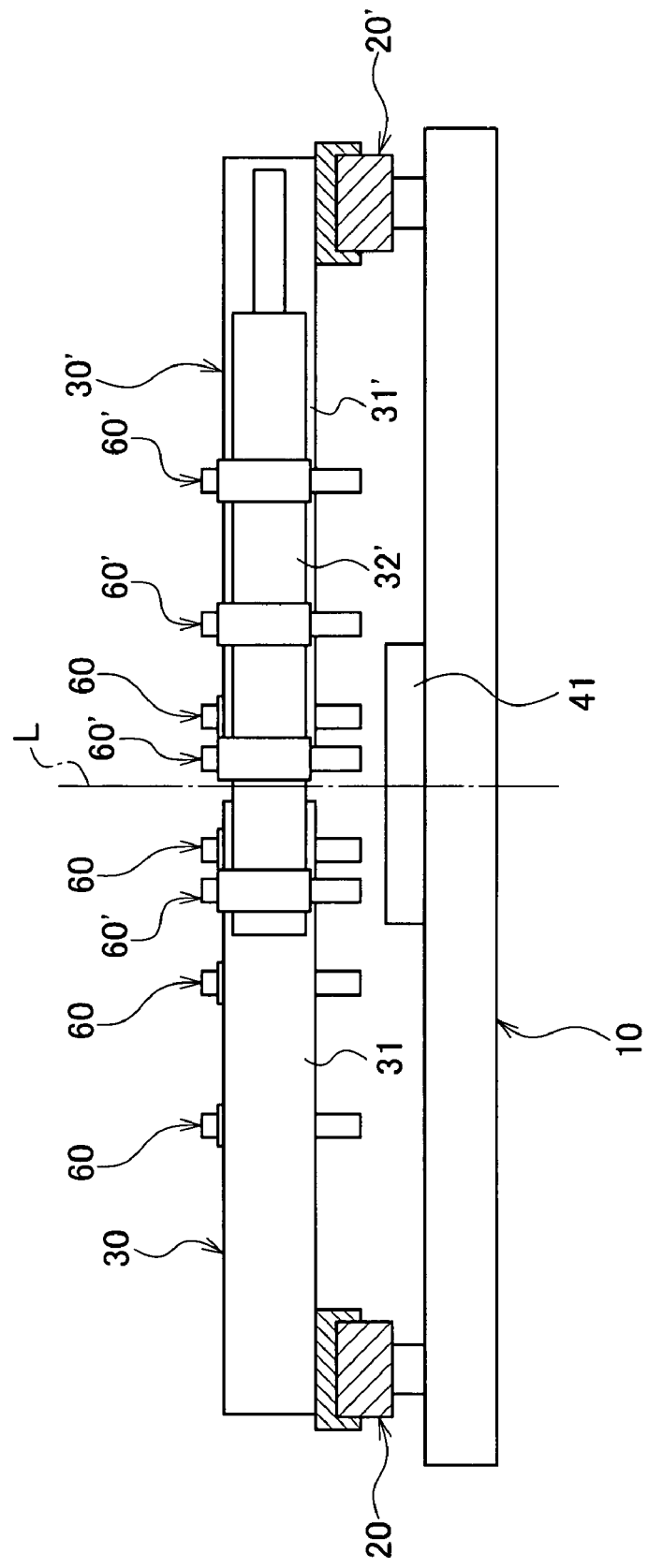
FIG. 10 is a front view of the work handling apparatus in which the direct-acting arm shown in FIG. 9A is employed.

FIG. 9A, FIG. 9B and FIG. 10 show other embodiments in which the configuration of the work tool which constitutes a part of the work handling apparatus according to the first aspect of the present invention is modified, and FIG. 10 is a front view of the apparatus having the configuration of the embodiment shown in FIG. 9A.

In the apparatus shown in FIG. 9A and FIG. 10, a plurality of (four in this case) work tools 60, 60' may be mounted on one side surface of the extendable arms 32, 32'. In the apparatus shown in FIG. 9B, a plurality of (eight in this case) work tools 60, 60' may be mounted on both side surfaces of the extending arms 32, 32'.

In this manner, by the provision of a plurality of work tools 60, 60' on the extendable arms 32, 32', when a plurality of work tools 60, 60' are of the same type, a plurality of works W of the same type can be transferred at the same time. On the other hand, when a plurality of work tools 60, 60' are of the different types, the different types of the works W can be transferred at the same time.

It is also possible to select (use) only the work tools 60, 60' which can easily correspond to the works W or the positions of the work storage area 50 where the works W are stored to transfer only the corresponding works W instead of using all of the work tools 60, 60' at the same time.

In addition, when different types of works W (for example, a main work and a plurality of sub-works) are transferred at the same time, the sub-works may be assembled continuously in sequence to the main work without returning to the work storage area 50 for each work, so that the reduction of the transfer time and the operation time and improvement of efficiency of the transfer and the operation are achieved.

Figure 11A:
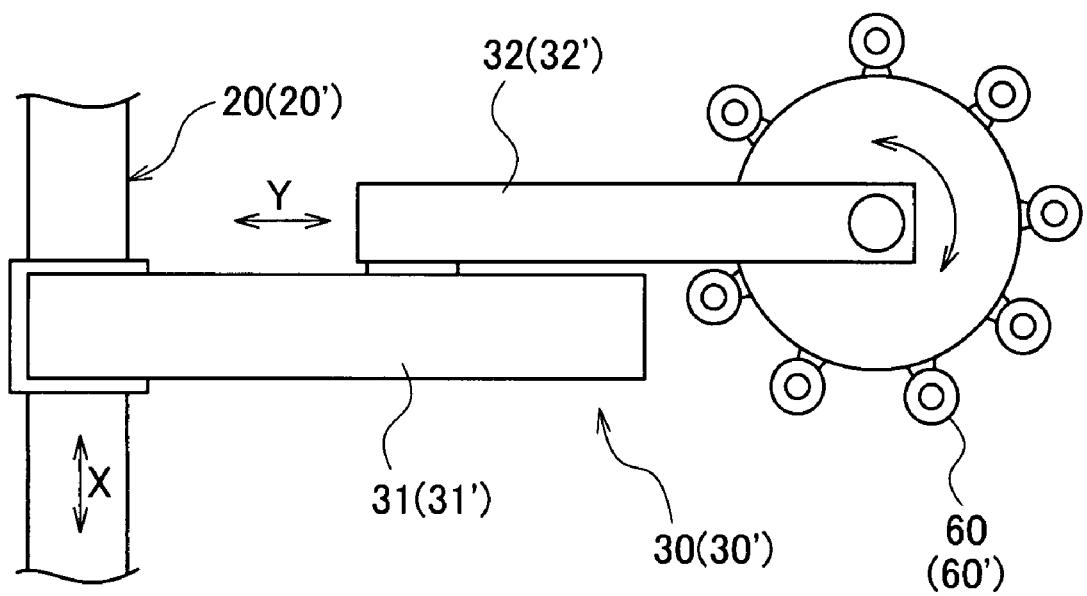
FIG. 11A and FIG. 11B are partial plan view and partial front view of the direct-acting arm according to still another embodiment.
Figure 11B:
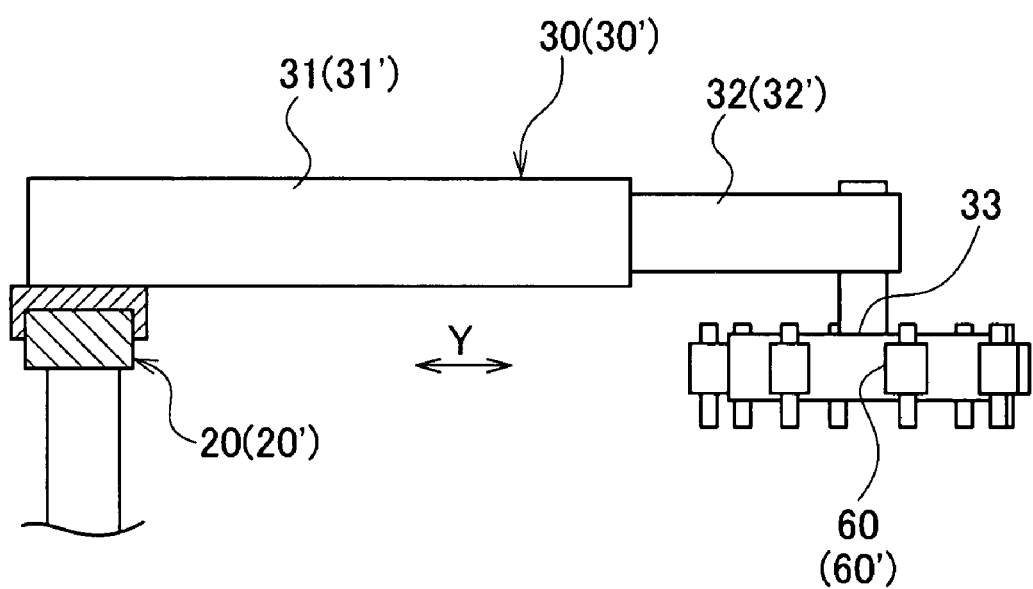

FIG. 11A and FIG. 11B show another embodiment in which the configuration of the pair of direct-acting arms which constitute a part of the work handling apparatus according to the first aspect of the present invention is modified. In this apparatus, as shown in FIG. 11A and FIG. 11B, each of the extendable arms 32, 32' is provided with a disk-shaped rotating disk 33 at the tip end thereof so as to be capable of rotating about the vertical line thereof. The rotating disk 33 is configured so that a plurality of (eight in this case) work tools 60, 60' can be mounted in the circumferential direction.

In this manner, by the provision of the rotatable rotating disk 33 which hold the plurality of work tools 60, 60', the positional relationship between the work W and the operation spot 41, or the corresponding relationship between the work W and the work tools 60, 60' can be selected for positioning by rotating the rotating disk 33, so that the smooth transfer operation is enabled.

Figure 12:
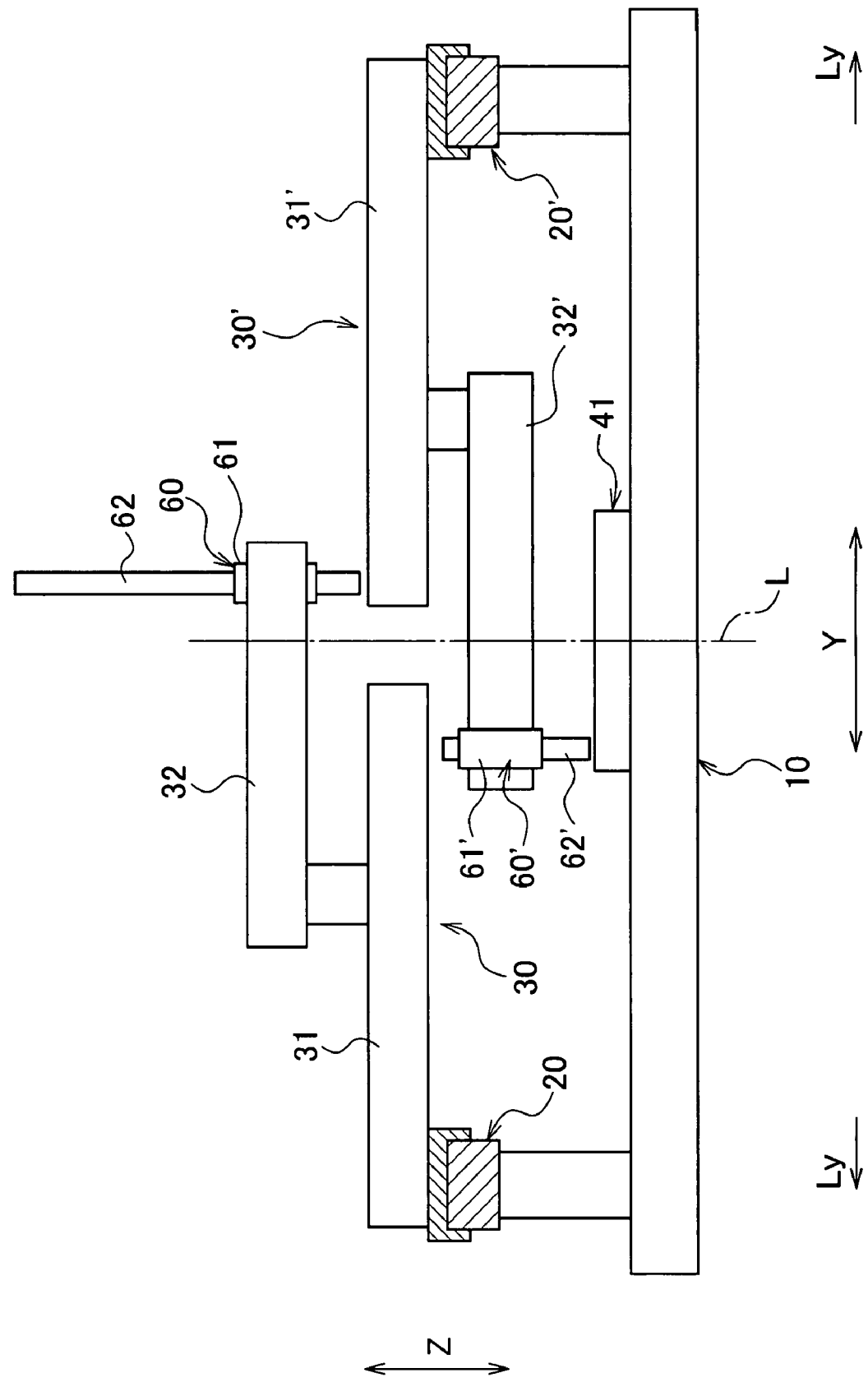
FIG. 12 is a front view of the work handling apparatus showing the direct-acting arm according to still another embodiment.

FIG. 12 shows still another embodiment in which the configuration of the pair of direct-acting arms which constitute a part of the work handling apparatus according to the first aspect of the present invention is modified. In this apparatus, the extendable arm 32 included in the one direct-acting arm 30 and the extendable arm 32' included in the other direct-acting arm 30' are arranged at different heights in the vertical direction Z. The extendable arm 32 positioned on the upper side is provided with the work tool 60 having the elevation grip hand 62 (or the operation tool unit) whose movement stroke is long, and the extendable arm 32' positioned on the lower side is provided with the work tool 60' having the elevation grip hand 62' (or the operation tool unit) whose movement stroke is short.

In this manner, since the extendable arms 32, 32' are arranged at different heights, mutual interference between the pair of direct-acting arms 30, 30' can be prevented without the extendable arms 32, 32' contracting completely to the contracted position when the pair of direct-acting arms 30, 30' go by during the movement in the front-and-rear direction X. Consequently, the contracting operation for preventing interference can be no longer necessary partly or completely, so that the transfer operation can be performed further smoothly.

Figure 13:
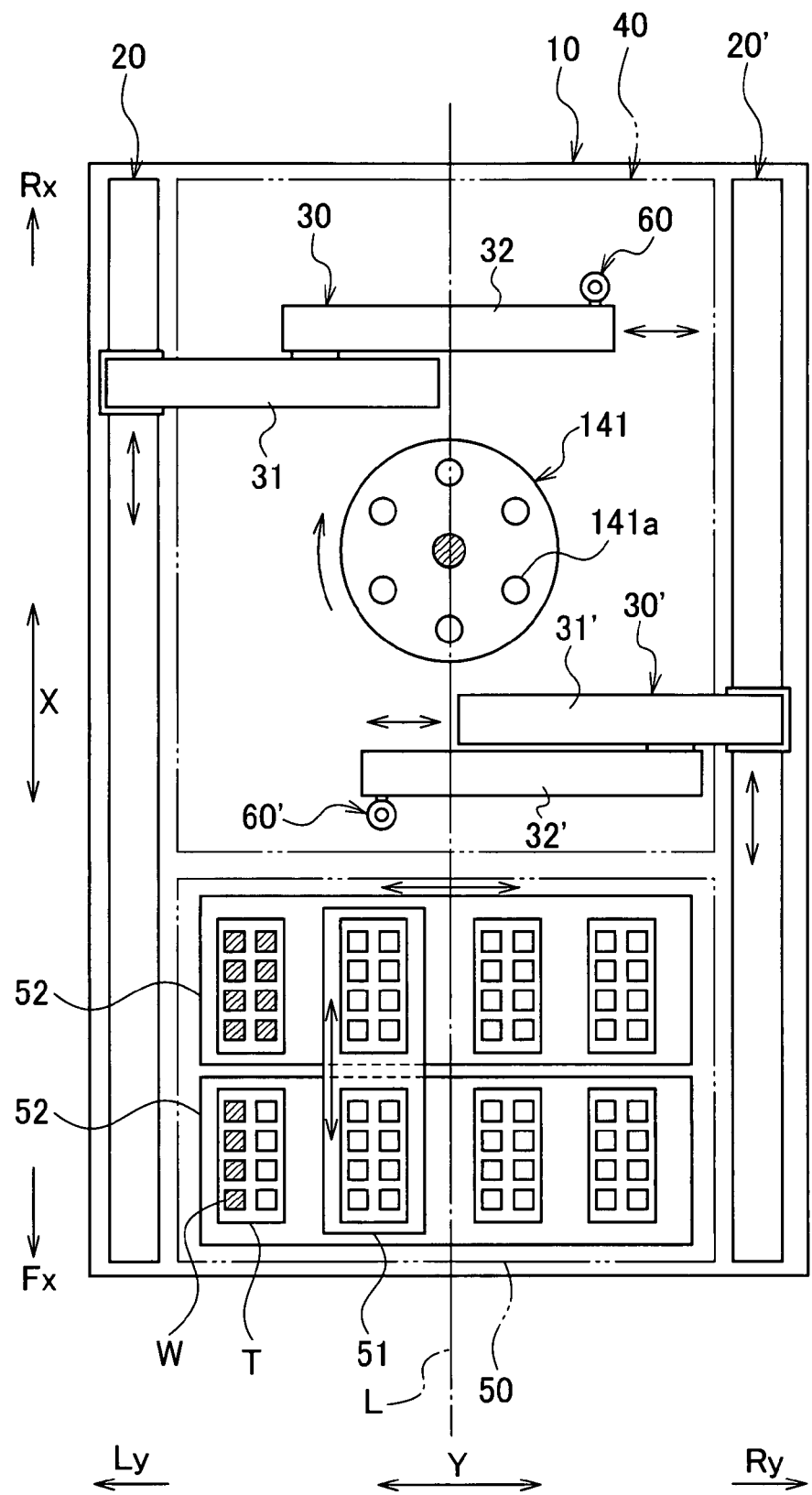
FIG. 13 is a plan view of the work handling apparatus according to still another embodiment of the present invention.
Figure 14:
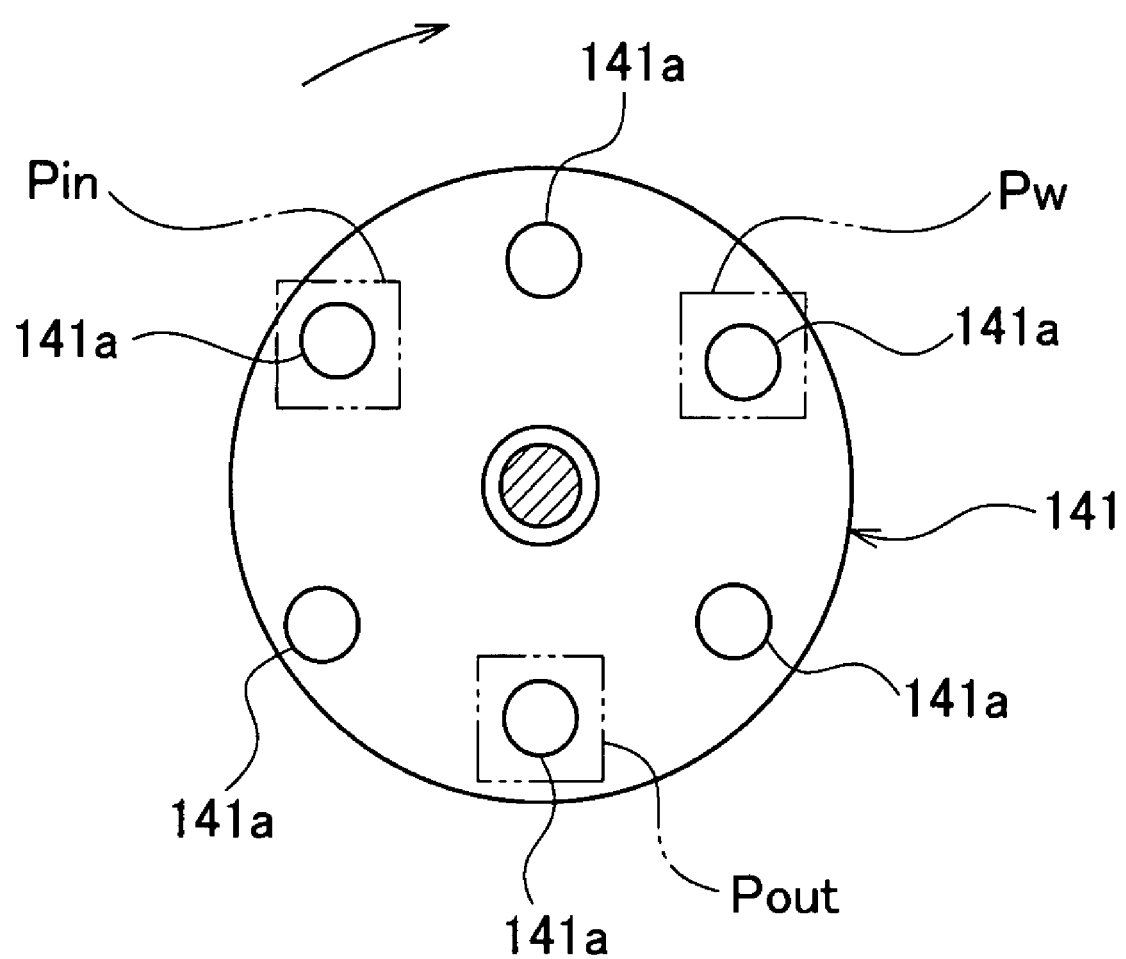
FIG. 14 is an enlarged plan view of an operation spot included in the work handling apparatus shown in FIG. 13.

FIG. 13 and FIG. 14 show still another embodiment of the work handling apparatus according to the first aspect of the present invention, in which a rotating table 141 is applied as the operation spot, and a front-and-rear movement mechanism 51 and a right-and-left movement mechanism 52 are provided in the work storage area 50 of the embodiment shown in FIG. 1.

In this apparatus, as shown in FIG. 13, the front-and-rear movement mechanism 51 for moving the tray T carrying works W in the front-and-rear direction X and the right-and-left movement mechanism 52 for moving the tray T carrying works W in the right-and-left direction Y are provided in the work storage area 50. Then, the tray T carrying works W can be moved in the front-and-rear direction X for replacement by the front-and-rear movement mechanism 51, and the tray T carrying works W can be moved in the right-and-left direction Y for replacement by the right-and-left movement mechanism 52.

Accordingly, for example, storage, waiting, or selection of the works W can be performed easily by the replacement of the treated works W with the untreated works W.

The rotating table 141 having a plurality of (six in this case) work holding units 141a arranged in the circumferential direction as the operation spot is provided in the operation area 40. The rotating table 141 is rotatably supported by the base 10 so as to rotate stepwise at intervals of a predetermined angle (60° in this case). On the base 10, as shown in FIG. 14, a work loading position Pin where the direct-acting arms 30, 30' load the works W, a work operating position Pw where a predetermined operation is applied to the works W, and a work unloading position Pout where the direct-acting arms 30, 30' unload the works W are set at fixed positions corresponding to the three work holding units 141a located on the rotating table 141 at equal intervals.

Then, by the rotation of the rotating table 141 at every 60 degrees, the work holding units 141a are positioned simultaneously at the work loading position Pin, the work operating position Pw and the work unloading position Pout respectively, so that the works W are positioned.

That is, since the rotating table 141 serves as an index table and the positioning operations for the work loading position Pin, the work operating position Pw and the work unloading position Pout are performed simultaneously, there is no waiting time and hence the productivity can be further improved (high-throughput is achieved). When the positioning operation of the works W is performed simultaneously for at least the work loading position Pin and the work unloading position Pout, the working efficiency is improved.

Figure 15:
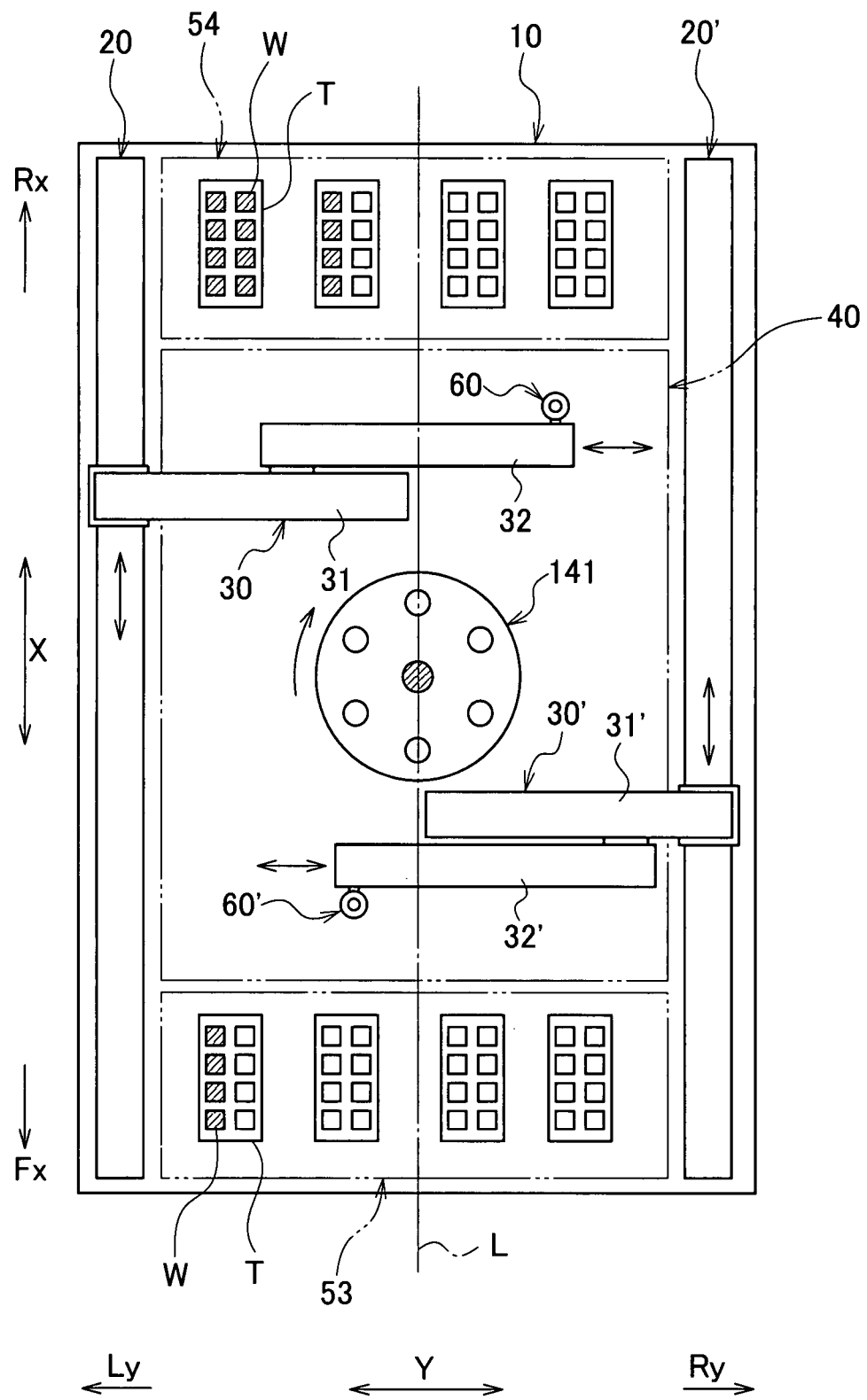
FIG. 15 is a plan view of the work handling apparatus according to still another embodiment of the present invention.

FIG. 15 shows still another embodiment of the work handling apparatus according to the first aspect of the present invention, in which the work storage area is modified with respect to the embodiment shown in FIG. 13 shown above.

In this apparatus, a work loading area 53 for loading and storing an untreated works W is arranged on the front side Fx as a work storage area and a work unloading area 54 for storing a treated work W to be unloaded is arranged on the rear side Rx as a work storage area in the front-and-rear direction X on the base 10. That is, the work loading area 53 and the work unloading area 54 are arranged separately at both end sides in the front-and-rear direction X with the operation area 40 sandwiched therebetween.

Then, the pair of direct-acting arms 30, 30', by respective independent transfer operations, load an untreated work W from the work loading area 53 to the operation spot (rotating table) 141 or unload a treated work W from the operation spot (rotating table) 141 to the work unloading area 54 while holding the work W with the work tools 60, 60'.

In this manner, by arranging the work loading area 53 and the work unloading area 54 at the both end sides in the front-and-rear direction X, an arrangement along the flow of work W from loading through operation to unloading is achieved, the loading operation and the unloading operation of the pair of direct-acting arms 30, 30' are performed smoothly, so that the productivity can be improved.

Figure 16:
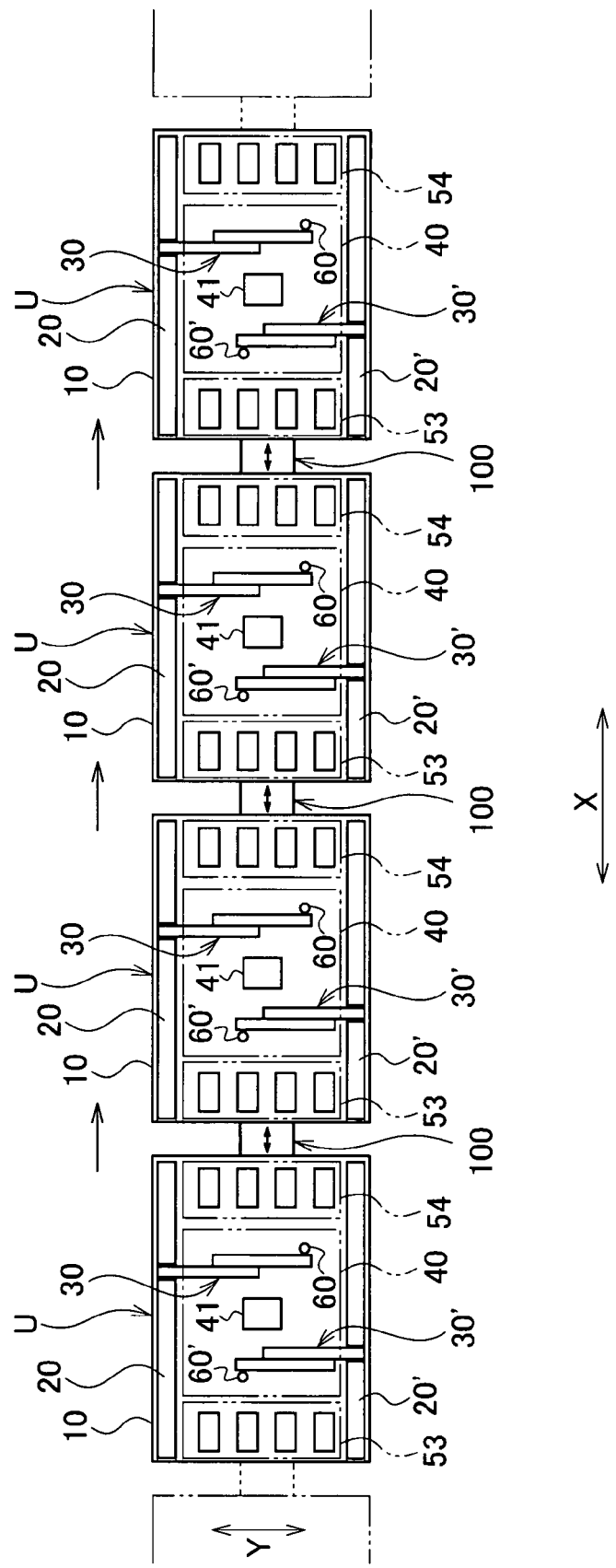
FIG. 16 is a plan view showing an embodiment of the work handling apparatus according to a second aspect of the present invention.

FIG. 16 shows an embodiment of the work handling apparatus according to the second aspect of the present invention. In this apparatus, as shown in FIG. 16, a single operation unit U is composed of the base 10, the pair of traveling guides 20, 20', the pair of direct-acting arms 30, 30', the operation area 40 including the operation spot 41, the work loading area 53 and the work unloading area 54 serving as a work storage areas and the work tools 60, 60', as described above.

Then, a plurality of the operation units U are arranged in the front-and-rear direction X (the extending direction of the traveling guides 20, 20') and the operation units U next to each other are connected in series by a connecting and transferring mechanism 100, so that the works W are transferred between the operation unit U on the upstream side and the operation unit U on the downstream side.

In this apparatus, when an operation is completed in the operation unit U on the upstream side, the pair of direct-acting arms 30, 30' hold the treated works W and transfer the treated work W to the work unloading area 54 to store the treated work W temporarily. Then, the connecting and transferring mechanism 100 transfers the work W to the work loading area 53 of the operation unit U on the downstream side. Then, the pair of direct-acting arms 30, 30' included in the operation unit U take out the work W from the work loading area 53 and load the work W to the operation spot 41 and the operation spot 41 performs a predetermined operation with respect to the work W. When the operation is completed, the pair of direct-acting arms 30, 30' transfer the work W to the work unloading area 54 and stores the work W temporarily. Then, the connecting and transferring mechanism 100 on the downstream side transfers the work W to the work loading area 53 of the operation unit U on further downstream side and the same sequence is repeated. That is, the works W are transferred from the operation unit U on the upstream side toward the operation unit U on the downstream side in sequence via the connecting and transferring mechanism 100 to perform a series of operations.

Therefore, by assigning a required operation process to the respective operation units U in advance and transferring the works W from the operation unit U on the upstream side to the operation unit U on the downstream side in sequence, the series of related operations assigned to the works W can be performed continuously, and hence the operation can be automated, so that the productivity can be improved. In this manner, by employing the operation unit U as a basic configuration and changing the work tools 60, 60' or the operation spot 41, an operation units U specialized for respective types of operations can be configured and hence an apparatus in which various types of specific operation can be performed while achieving equipment cost reduction is provided.

FIG. 17 shows another embodiment of the work handling apparatus according to the second aspect of the present invention, in which the connecting and transferring mechanism 100 included in the embodiment shown in FIG. 16 described above is eliminated.

In this apparatus, as shown in FIG. 17, a plurality of the operation units U are arranged in adjacent in the front-and-rear direction X and connected directly in series, and the pair of traveling guides 20, 20' are formed so as to extend to the front end and the rear end of the base 10, so that the stoppers at both ends are eliminated.

In this structure, the pair of traveling guides 20, 20' included in the respective operation units U are arranged so as to be connected linearly in series in the front-and-rear direction X and the pair of direct-acting arms 30, 30' included in the respective operation units U can be transferred to another operation unit U adjacent thereto.

That is, the pair of direct-acting arms 30, 30' included in the respective operation units U are formed to serve also as a connecting and transferring mechanism for connecting the adjacent operation units U and transferring the works W. Therefore, a specific connecting and transferring mechanism is no longer necessary, so that the structure can be simplified and the aggregation and downsizing of the apparatus are achieved.

In this apparatus, when the operation is completed in the operation unit U on the upstream side, the pair of direct-acting arms 30, 30' hold the treated work W, transfer the treated work W to the work unloading area 54 and stores the treated work W temporarily. Then, the pair of direct-acting arms 30, 30' included in the operation unit U on the downstream side are transferred to the operation unit U on the upstream side, hold the work W stored in the work unloading area 54 and return to the operation unit U on the downstream side to hand the work W to the work loading area 53. Besides, the pair of direct-acting arms 30, 30' included to the operation unit U on the upstream side may be driven to be transferred to the operation unit U on the downstream side to hand the work W.

That is, the works W are transferred via the pair of direct-acting arms 30, 30' which can be transferred to the adjacent another operation unit U from the operation unit U on the upstream side toward the operation unit U on the downstream side in sequence to perform a series of operations.

Therefore, by assigning a required operation process to the respective operation unit U in advance and transferring the work W from the operation unit U on the upstream side to the operation unit U on the downstream side in sequence, the series of related operations assigned to the works W can be performed continuously and hence the operation can be automated, so that the productivity can be improved.

It is also possible to employ a configuration in which the work loading area 53 or the work unloading area 54 included in each operation units U serves as a connecting and transferring mechanism instead of using the pair of direct-acting arms 30, 30' included in the respective operation units U as a connecting and transferring mechanism. In this case, the work loading area 53 or the work unloading area 54 included in each operation unit U serves to deliver the work W, whereby the specific connecting and transferring mechanism is no longer necessary as descried above, so that the structure can be simplified and aggregation and downsizing of the apparatus are achieved. Besides, it is also possible to eliminate one of the work unloading area 54 on the upstream side and the work loading area 53 on the downstream side and employ an area common to the upstream side and the downstream side.

FIG. 18 shows still another embodiment of the work handling apparatus according to the second aspect of the present invention.

In this apparatus, as shown in FIG. 18, a single operation unit U is composed of the base 10, the pair of traveling guides 20, 20', the pair of direct-acting arms 30, 30', the operation area 40 including the operation spot 41, the work loading area 53 and the work unloading area 54 as a work storage areas and the work tools 60, 60', as described above.

A plurality of the operation units U are arranged in the right-and-left direction Y (the extending direction of the direct-acting arms 30, 30'), and the operation units U next to each other are connected in parallel by a connecting and loading mechanism 110 and a connecting and unloading mechanism 120 as a connecting and transferring mechanism. That is, the connecting and loading mechanism 110 is formed so as to connect the work loading areas 53 of the adjacent operation units U to load the work W and the connecting and unloading mechanism 120 is formed so as to connect the work unloading areas 54 of the adjacent operation units U to unload the work W.

In this apparatus, when the same operation is performed in the respective operation units U, the works W are loaded to the respective operation units U from the connecting and loading mechanism 110. Then, the operation is applied to the work W in the respective operation units U, and the work W is unloaded via the connecting and unloading mechanism 120 from the operation unit U having completed the operation in sequence. Therefore, the efficient operation and transfer are achieved as a whole, and hence the productivity can be improved. In this apparatus, the connecting and transferring mechanism can be arranged at the front and/or the rear of the operation unit U, whereby a flexible layout is achieved. Furthermore, effective production is achieved by increasing or decreasing the number of the operation units U to be installed according to the increase or decrease of the amount of production, reduction of the production cost is achieved.

As described above, according to the work handling apparatus in the present invention, simple structure, aggregation of the respective mechanism, downsizing of the entire apparatus, saving of the installing area and the reduction of time required for transferring the works are achieved, and the various operations such as coating, heat processing, chemical processing and cleaning, inspection, measurement, machining and assembly for the works including electronic parts such as a semiconductor chip or substrate, or machine parts are achieved efficiently, so that the productivity can be improved.

INDUSTRIAL APPLICABILITY

As described above, the work handling apparatus according to the present invention is effective in the field of manufacturing of semiconductor as a matter of course as well as the fields relating to a production line of automotive vehicles or parts thereof, a production line of electronic equipment or parts thereof, and other machines or electronic parts as long as it is the field in which the transfer and positioning of the works are required when applying various operations to the works.

The invention claimed is:

1. A work handling apparatus comprising:
a base;
a left traveling guide provided so as to extend in a front-and-rear direction at a left side of the base;
a right traveling guide provided so as to extend in the front-and-rear direction at a right side of the base;
a left extendable sliding arm including a first arm extending in a right-and-left direction and movably supported along the left traveling guide at a left end thereof and at least one extendable arm capable of extending and contracting in the right-and-left direction with respect to the first arm;
a right extendable sliding arm including a first arm extending in a right-and-left direction and movably supported along the right traveling guide at a right end thereof and at least one extendable arm capable of extending and contracting in the right-and-left direction with respect to the first arm;
the left extendable sliding arm and the right extendable sliding arm being extendable from contracted positions at which the extendable arms of the left extendable sliding arm and the right extendable sliding arm oppose each other and avoid mutual interference in the right-and-left direction to extended positions at which the extendable arms of the left extendable sliding arm and the right extendable sliding arm extend and overlap with each other in the right-and-left direction;
an operation spot arranged in an operation area sandwiched between the left traveling guide and the right traveling guide for performing a predetermined operation on a work; and
work tools attached to the extendable arms of the left extendable sliding arm and the right extendable sliding arm, respectively, for transferring the work between a predetermined position and the operation spot for performing an operation after transfer.

2. The work handling apparatus according to claim 1, wherein the work tools include main bodies to be detachably attached on the left extendable sliding arm and the right extendable sliding arm, respectively, and elevation grip hands connected to the main bodies so as to be capable of elevating in a vertical direction for gripping the work.

3. The work handling apparatus according to claim 1, wherein the work tools include main bodies to be detachably attached on the left extendable sliding arm and the right extendable sliding arm, respectively, and an operation tool unit connected to the main bodies so as to be capable of elevating in a vertical direction for holding the work and performing an operation.

4. The work handling apparatus according to claim 1, comprising a work storage area for storing the works temporarily in order to load and unload the works in adjacent to the operation area.

5. The work handling apparatus according to claim 4, wherein the work storage area is arranged on one end side of the operation area in the front-and-rear direction.

6. The work handling apparatus according to claim 4, wherein the work storage area includes a work loading area for loading and storing untreated works, and a work unloading area for storing treated works to be unloaded, and the work loading area and the work unloading area are arranged on opposite end sides in the front-and-rear direction with the operation area sandwiched therebetween.

7. The work handling apparatus according to claim 1, further comprising a tool storage area for replaceably storing various types of work tools corresponding to various types of works, the tool storage area being located adjacent to the operation area.

8. The work handling apparatus according to claim 1, wherein each extendable arm is provided with a plurality of work tools.

9. The work handling apparatus according to claim 1, wherein each extendable arm is provided with a disk-shaped rotating disk, and the rotating disk is provided with a plurality of work tools in a circumferential direction.

10. The work handling apparatus according to claim 1, wherein the extendable arm of the left extendable sliding arm and the extendable arm of the right extendable sliding arm are arranged at different heights in a vertical direction.

11. The work handling apparatus according to claim 1, wherein the operation spot is provided with a rotating table having a plurality of work holding units arranged in a circumferential direction, and the rotating table is formed so as to position the work holding units simultaneously at a work loading position where the left extendable sliding arm and the right extendable sliding arm load the work, a work operating position where an operation is applied to the work, and a work unloading position where the left extendable sliding arm and the right extendable sliding arm unload the work by rotating by a predetermined angle.

12. A work handling apparatus comprising:
a plurality of operation units, each of the operation units including a base, a left traveling guide provided so as to extend in a front-and-rear direction at a left side of the base, a right traveling guide provided so as to extend in a front-and-rear direction at a right side of the base, a left extendable sliding arm including a first arm extending in a right-and-left direction and movably supported along the left traveling guide at a left end thereof and at least one extendable arm provided so as to be capable of extending and contracting in the right-and-left direction with respect to the first arm, a right extendable sliding arm that includes a first arm extending in the right-and-left direction and movably supported along the right traveling guide at a right end thereof and at least one extendable arm provided so as to be capable of extending and contracting in the right-and-left direction with respect to the first arm, the left extendable sliding arm and the right extendable sliding arm being extendable from contracted positions at which to the extendable arms of the left extendable sliding arm and the right extendable sliding arm oppose each other and avoid mutual interference in the right-and-left direction to extended positions at which the extendable arms of the left extendable sliding arm and the right extendable sliding arm extend and overlap with each other, an operation spot arranged in an operation area sandwiched between the left traveling guide and the right traveling guide for performing a predetermined operation on the work, a work storage area arranged in adjacent to the operation area for storing the works temporarily in order to load and unload the works, and work tools attached respectively to the extendable arms of the left extendable sliding arm and the right extendable sliding arm for transferring the works between the work storage area and the operation spot or for performing an operation after transfer; and
a connecting and transferring mechanism for transferring the works by connecting the plurality of operation units next to each other in a state in which the plurality of operation units are arranged.

13. The work handling apparatus according to claim 12, wherein the plurality of operation units are arranged in the front-and-rear direction.

14. The work handling apparatus according to claim 13, wherein the work storage area includes a work loading area for loading and storing works and a work unloading area for storing the works to be unloaded which are arranged respectively on opposite end sides in the front-and-rear direction with the operation area sandwiched therebetween, and the connecting and transferring mechanism connects the work unloading area of the operation units positioned on an upstream side and the work loading area of the operation unit located on a downstream side.

15. The work handling apparatus according to claim 12, wherein a plurality of the operation units are connected directly and arranged in the front-and-rear direction, the pair of direct-acting arms included in each of the operation unit serve as the connecting and transferring mechanism.

16. The work handling apparatus according to claim 12, wherein a plurality of the operation units are directly connected and arranged in the front-and-rear direction, the work storage area includes a work loading area for loading and storing the works and a work unloading area for storing the works to be unloaded which are arranged respectively on opposite end sides in the front-and-rear direction with the operation area sandwiched therebetween, and the work loading area or the work unloading area also serves as the connecting and transferring mechanism.

17. The work handling apparatus according to claim 12, wherein a plurality of the operation units are arranged in the right-and-left direction, and the connecting and transferring mechanism connects the operation units mutually in parallel.

18. The work handling apparatus according to claim 17, wherein the work storage area includes a work loading area for loading and storing the works and a work unloading area for storing the works to be unloaded which are arranged respectively on opposite end sides in the front-and-rear direction with the operation area sandwiched therebetween, and the connecting and transferring mechanism includes a connecting and loading mechanism for connecting the work loading areas of the operation units next to each other, and a connecting and unloading mechanism for connecting the work unloading areas of the operation units next to each other.

* * * * *